(12) United States Patent
Williams, Sr.

(10) Patent No.: US 10,246,200 B2
(45) Date of Patent: Apr. 2, 2019

(54) CENTRIPETAL AERODYNAMIC PLATFORM SPACECRAFT

(71) Applicant: Lawrence Ellis Williams, Sr., Richmond, VA (US)

(72) Inventor: Lawrence Ellis Williams, Sr., Richmond, VA (US)

( * ) Notice: Subject to any disclaimer, the term of this patent is extended or adjusted under 35 U.S.C. 154(b) by 0 days.

(21) Appl. No.: 15/394,880

(22) Filed: Dec. 30, 2016

(65) Prior Publication Data

US 2017/0190446 A1 Jul. 6, 2017

Related U.S. Application Data

(60) Provisional application No. 62/273,497, filed on Dec. 31, 2015.

(51) Int. Cl.
| | | |
|---|---|---|
| *B64G 1/14* | (2006.01) | |
| *B64G 1/40* | (2006.01) | |
| *F02K 7/14* | (2006.01) | |
| *F02K 7/16* | (2006.01) | |
| *B64G 1/46* | (2006.01) | |
| *B64C 39/06* | (2006.01) | |

(52) U.S. Cl.
CPC ............. *B64G 1/14* (2013.01); *B64C 39/06* (2013.01); *B64G 1/405* (2013.01); *B64G 1/46* (2013.01); *F02K 7/14* (2013.01); *F02K 7/16* (2013.01); *F05D 2220/10* (2013.01)

(58) Field of Classification Search
CPC .. B64G 1/14; B64G 1/405; B64G 1/46; B64C 39/06; F02K 7/14; F02K 7/16; F05D 2210/10

USPC ........................................................ 244/159.3
See application file for complete search history.

(56) References Cited

U.S. PATENT DOCUMENTS

| | | | | |
|---|---|---|---|---|
| 3,018,068 A | * | 1/1962 | Frost | B64C 39/001 244/15 |
| 3,020,003 A | * | 2/1962 | Frost | B64C 39/001 244/15 |
| 4,023,751 A | * | 5/1977 | Richard | B64C 39/001 244/23 C |
| 4,214,720 A | * | 7/1980 | DeSautel | B64C 39/001 244/12.2 |
| 4,452,410 A | * | 6/1984 | Everett | B64C 39/06 244/12.2 |
| 4,457,476 A | * | 7/1984 | Andresevitz | B64C 29/00 244/23 C |
| 4,824,048 A | * | 4/1989 | Kim | B64D 27/20 244/12.2 |
| 4,901,948 A | * | 2/1990 | Panos | B64C 15/00 244/230 |
| 5,031,857 A | * | 7/1991 | MacConochie | B64C 3/40 244/3.28 |
| 5,178,344 A | * | 1/1993 | Dlouhy | B64C 27/20 244/12.2 |
| 5,836,542 A | * | 11/1998 | Burns | B64C 39/001 244/12.2 |
| 5,881,970 A | * | 3/1999 | Whitesides | B64B 1/02 244/12.2 |

(Continued)

*Primary Examiner* — Joshua E Rodden
(74) *Attorney, Agent, or Firm* — Eldredge Law Firm

(57) ABSTRACT

An aerodynamic platform or spacecraft including a habitable 1G centripetal force rotating gravity producing interior corridor within an aerodynamic shell and an aerodynamic drone booster launch system with reentry and reuse capability.

6 Claims, 39 Drawing Sheets

(56) References Cited

U.S. PATENT DOCUMENTS

| | | | | |
|---|---|---|---|---|
| 6,123,295 | A * | 9/2000 | Wexler | B64C 1/0009 |
| | | | | 244/172.3 |
| 6,371,406 | B1 * | 4/2002 | Corcoran | B64C 15/02 |
| | | | | 244/12.2 |
| 6,454,216 | B1 * | 9/2002 | Kiselev | B64G 1/14 |
| | | | | 244/159.3 |
| 6,523,782 | B2 * | 2/2003 | Barutt | B64G 1/12 |
| | | | | 244/171.9 |
| 6,595,466 | B2 * | 7/2003 | Depeige | B64C 39/02 |
| | | | | 244/118.3 |
| 7,654,489 | B2 * | 2/2010 | Stephenson | B64G 1/14 |
| | | | | 244/159.1 |
| 7,866,601 | B2 * | 1/2011 | Balaskovic | B64B 1/06 |
| | | | | 244/30 |
| 8,528,853 | B2 * | 9/2013 | Luther | B64C 1/00 |
| | | | | 244/158.1 |
| 8,894,002 | B2 * | 11/2014 | Goelet | B64B 1/005 |
| | | | | 244/26 |
| 2001/0010347 | A1 * | 8/2001 | Hart | B64G 1/14 |
| | | | | 244/159.3 |
| 2003/0098388 | A1 * | 5/2003 | Walmsley | B64C 27/20 |
| | | | | 244/12.2 |
| 2005/0230525 | A1 * | 10/2005 | Paterro | B64C 39/001 |
| | | | | 244/23 B |
| 2018/0057193 | A1 * | 3/2018 | Douglas | B64G 7/00 |

* cited by examiner

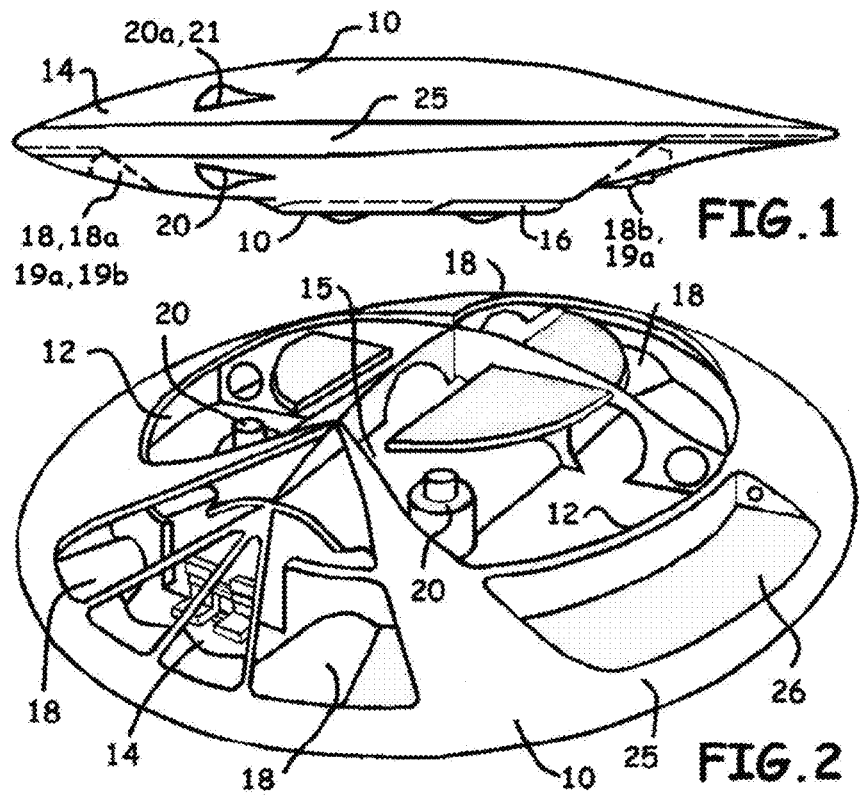
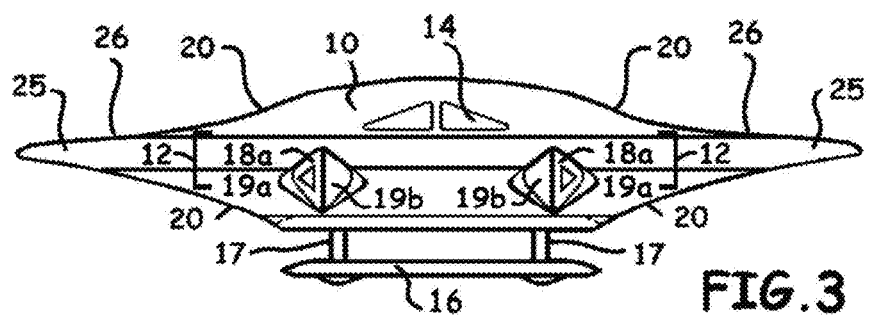

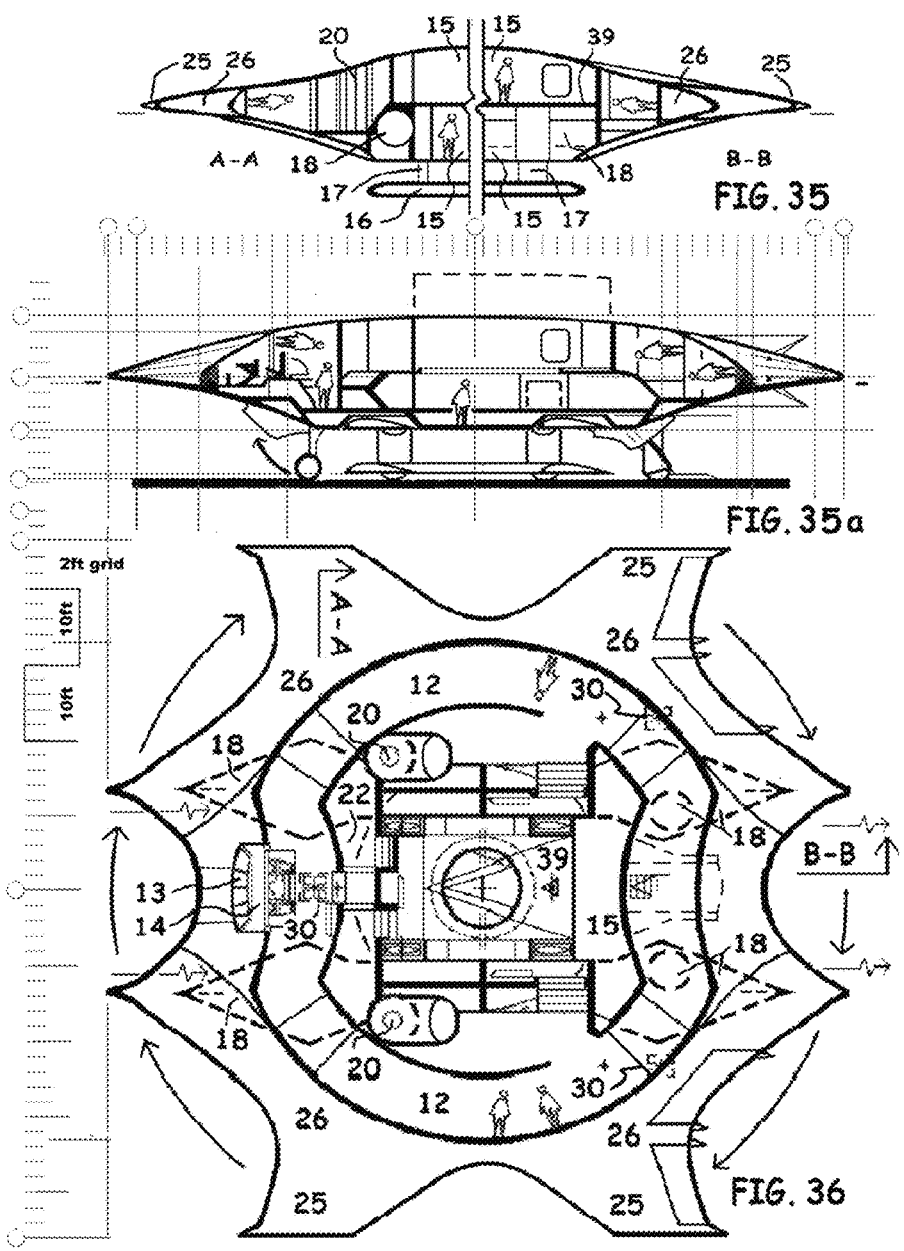

CENTRIPETAL AERODYNAMIC PLATFORM SPACECRAFT

This application claims the benefit of U.S. Provisional Application No. 62/273,497, filed Dec. 31, 2015. This invention relates to the field of Aerospace. More particularly the present invention is in both the field of aeronautics and astronautics engineering and specifically aircraft and spacecraft design.

TECHNICAL FIELD

Background

This invention applies particularly to the configuration of a structure delimiting a rotating gravity producing interior using centripetal force in orbit and deep space. The patent represents the embodiment of the first habitable, 1G, centripetal, fixed or rotating gravity ring corridor or zone inside an aerodynamic, atmospheric, reentry lifting body. The 1G, centripetal gravity ring corridor, platform or area to be used by passengers of a spacecraft defines a habitable space that can also contain the pilots' cabin or cockpit and work sleep zones.

The level of loads and optimized radius of a circular configuration required to achieve 1G zones is taken into account in the design of the reentry craft and has special influence on the design of the structure delimiting the habitable zones that withstand centripetal forces in space and aerodynamic forces during reentry, flight and landing.

The capability of such structure to resist such loads depends particularly on the efficient shell geometry, balanced centers of gravity and the symmetrical aerospace structural ribbing of the structure.

The generally cylindrical, cargo in a can or smokestack, silo pipe structures delimiting the cabin and body of conventional aircraft and spacecraft is particularly favorable for resistance to aerodynamic forces, load stress and launch dynamics.

However, a structure of this type has to be linear and connected by ring gaskets and structural ribs to withstand exploding fuel forces at each end and stage of rockets and aerodynamic lift forces in aircraft. This linear, cylindrical shape is meaningless and restrictive once in space and the heavy lift cylindrical can dead weight components and payload containers are abandoned to reduce weight at each launch stage to deliver a payload.

Furthermore, an approximately cylindrical stack geometry with or without wings and the related weight to surface area ratio when long wings are included limits possibilities for increasing passenger habitable zones and payload volume (carrying capacity) per cubic foot of craft structure and surface area when compared to a sphere or flattened sphere.

Conversely, a sphere or flattened sphere provides for a centripetal 1G, corridor useful in space as within the ideal wheel space station. However space stations are too big to build and require multiple payloads and launches to construct. The international space station is only linear and one football field in length. This shape has no aerodynamic properties. Under reentry or flight a wheel station or current space lab, linear can, configuration would not survive reentry or flight forces and offer no level defined floor surface, ground level habitation or the ability to reenter space.

The less good capability of conventional non aerodynamic structures to resist reentry and flight loads then requires increase in wing spans, structure, and generally more expensive configurations and materials with many components abandoned usually makes conventional launch and reentry systems and related aerospace exploration costly.

SUMMARY OF THE INVENTION

The present invention is a replacement for the retired space shuttle and upper atmosphere aircraft flight and the word shuttle or craft shall imply, be called or referenced herein as the centripetal aerodynamic platform spacecraft.

The purpose of the invention is particularly to provide a simple, economic and efficient solution to these problems, to at least partially overcome the above mentioned disadvantages.

The present invention is a commercial aerospace device for users to achieve lower and upper atmosphere flight, low earth orbit, deep space missions, planetary staging orbits and planetary reentry, having a redesigned aerodynamic shuttle body and reusable launch system.

To achieve this, the invention discloses an aerospace booster launch system and high speed vertical takeoff and landing aircraft/spacecraft within an aerodynamic flattened sphere comprising a structure delimiting a habitable zone capable of producing rotational gravity in space with self-propulsion capabilities and cargo bays meeting industry and governmental ideal heavy lift guidelines.

According to the invention, when the centripetal aerodynamic platform spacecraft or shuttle structure is seen from above or on a landing surface it includes:

Two or more symmetrically balanced lateral portions respectively capable of delimiting a centripetal force of 1G within a ring of habitable zones, corridors or landings and separated from each other by a space defined as a cargo bay or staging areas with or without life support, flanked by jet to rocket hybrid engines with adjustable rear vertical and horizontal exhaust and vertical front lift engines all within an aerodynamic envelope externally delimiting the centripetal aerodynamic platform spacecraft.

The centripetal aerodynamic platform spacecraft preferably comprises landing gear housed inside the aerodynamic body with wheels that when deployed function typically and are positioned below a ring wing.

The centripetal aerodynamic platform space craft preferably incorporates a lower ring wing that provides balance and stability in flight and can be retracted when the craft is in stealth flight mode. The ring shaped wing eliminates the long wing spans and long fuselage of conventional aircraft. The ring wing having four one quarter sphere rounded bearing points below vertical struts support the lifting body with no damage to the wing surface. When landed conventionally with three standard two wheel landing gear, the ring shaped wing can be raised hydraulically with the landing gear up to lower the body closer to the ground surface. Docking in space is also improved.

The centripetal aerodynamic platform spacecraft flattened sphere envelope preferably comprises a cockpit floor that reclines 90 degrees to become a part of the 1G corridor system in space rotation travel.

The floor and walls of the habitable, 1G zones preferably will work equally as well in horizontal flight and landing as during the rotation of the structure in space.

The centripetal aerodynamic platform spacecraft flattened sphere preferably comprises but not limited to at least one front lower cargo bay door, one rear upper shuttle cargo bay door and one lower rear cargo bay door, two flanking cockpit access egress hatches from the underbody and one center top and bottom docking hatches.

The centripetal aerodynamic platform spacecraft preferably has a central airlock between the central cargo bay and the habitable zones allowing the cargo bay with adjustable ramped floor to become a depressurized fuel staging or work area.

The centripetal aerodynamic platform space craft has the ability to enter space on its own power. Two vertical lift hybrid turbojet-rocket engines provide front end vertical lift. Each engine produces 62,500 pound feet of vertical thrust and maneuvering rocket capability.

Preferably two horizontal inline hybrid hollow core turbojet-scramjet-rocket engines with perimeter bypass air conduits and pivoting rear exhaust, each produce but not limited to 62,500 pound feet of phase one turbojet thrust up to Mach 3.2 with after burner. Phase two, scramjet air is transitioned to the hollow core scramjet chamber. The hollow core rotating, inner tapered wall profile, air chamber then accommodates air flows and thinner density air for scramjet combustion at a minimum of Mach 6 but not limited to Mach 10 at 7,000 miles per hour. At Mach 6 however, the two parallel hybrid engines' air-breathing scramjet conduits gradually become inefficient and are gradually powered down, and transitioned by rotating ball valve to phase three, alternating afterburner pulse, scram pulse and rocket pulse burst supplied by atmospheric oxygen to but not limited to Mach 10. Phase four, onboard stored oxidizers enable the two hybrid rocket engines to accelerate to orbital velocities around Mach 17 to 25 above altitudes of 93,000 feet. Each hybrid engine has rear three sided rear open pointed pyramid or cone surface aerospike hybrid scramjet-rocket engine combustion chambers that power the centripetal aerodynamic platform spacecraft to Mach 25. The two in line horizontal hybrid rear rocket engines each power from 220,000 to 375,000 to a final 562, 500 pound feet of thrust, a total of 1,125,000 pound feet of thrust to reach low earth orbit. The hybrid turbojet-scramjet-rocket engine uses the same intake and exhaust opening built into the aerodynamic underbody reducing drag and the engine weight to thrust ratios. Stage one turbo jet engine weight guidelines is but not limited to 9,000 pounds each with air entry and exit at 72 inches to an internal 124 inches in diameter and generally 182 inches in length produce but not limited to in flight 62,500 pound feet of thrust per engine, well within industry standards and research parameters. Short pulse after burner thrust add an additional but not limited to 33 percent increase in turbojet engine thrust to 83,1125 pound feet. The thrust to hybrid engine weight is not limited to a standard of 6 to 1. Preferably the embodiment has triangular outer doors or self-closing stealth flaps that cover and protect engine intake and exhaust when engines are not in use. Four phased engine cycles overlap to provide seamless propulsion. It starts at the inlet which feed the turbojet and scramjet engine phases. While the scramjet has an unobstructed center flow path, the turbojet
components are concealed behind three sided variable volume air intake elements that open and close depending on the phase of flight. From zero airspeed to above Mach 1, the air intake inlet fully opens three flaps to allow flow to the jet turbine engine. Both horizontal engines would be operating to produce enough thrust to punch through the transonic drag peak. Above Mach 1, the inlet flaps to the turbine engine gradually close until, at Mach 2.5, the turbojet is gradually shut down and well within the main body to reduce drag and easily serviced in orbit. A short period of simultaneous phase two after burner thrust provides additional acceleration to Mach 3.2. Standard, easily handled jet fuel powers the system up to Mach 4. Phase two scramjet engines accelerate the system to Mach 10. Liquid methane and oxidizers are added seamlessly to phase three, alternating afterburner-scramjet-rocket pulse and phase four, rocket engine cycles to reach Mach 17, low Earth orbit or escape velocity, Mach 25. Outer engine protection doors and inlet flaps are closed in zero oxygen environments and glide path reentry.

The centripetal aerodynamic platform spacecraft unlike present industry spacecraft standards, when rotating provides a 1G environment that satisfies the need for the human body to be in environments above 15 to 20 percent of Earth's gravity to remain healthy. The centripetal aerodynamic platform spacecraft has built in long term habitat capabilities in space and when landed, reducing mission cost. The circular corridor zones in the design allows the centripetal aerodynamic platform spacecraft to create a 1G rotating gravity environment at 9.5 rotations per minute at a corridor radius of or about 33 feet and outer aerodynamic shell radius of or about 45 feet. The 17 foot high main body is preferably contained within a 90 foot diameter.

The centripetal aerodynamic platform spacecraft's two main engines, utilizing atmospheric oxygen, provide a total but not limited to 600,000 pound feet of phase two, scramjet thrust up to altitudes of 93,000 feet, facilitating aerodynamic, compression lift. A total of but not limited to 1,125,000 pound feet of hybrid phase four rocket engine thrust is provided to reach low Earth orbit. The 57,000 cubic foot aerodynamic flattened sphere embodiment can easily accommodate additional, reusable fuel containers of deflating, 4 inch thick, insulated, composite fabric and or increased payload areas without increasing the craft's envelope dimensions when compared to linear fuselage tank configurations. Liquid methane also reduces tank insulation structural thickness weight and requires less cryogenic maintenance at prelaunch. Liquid methane fuel tanks conservatively are 25 percent smaller than hydrogen tanks. The new engine with, but not limited to aerospike, atmospheric pressure, adjusting, hybrid rocket engines conservatively reduce fuel tank capacity another 33 percent. 100,000 cubic feet of hydrogen fuel tank capacity is reduced, but not limited to 42,000 cubic feet of liquid methane; 314,182 gallons at 1,111,717 pounds. Liquid oxygen is but not limited to 947 cubic feet, 7,084 gallons at 67,396 pounds. Jet fuel for phase one accent is but not limited to 12 gallons per second for a 125 second turbo and after burner assist accent, requiring 1,500 gallons. Jet fuel tank capacity is but not limited to 303 cubic feet, 2,266 gallons, at 14,000 lbs. Perimeter wing tanks hold 5,900 cubic feet of fuel with the lower storage bay level 1 of 2 levels and lower body holding the oxidizer and fuel balance. The total fuel and oxidizer tanks capacities are 43,250 cubic feet for independent accent embodiments. The retired space shuttle habitable zone was only 2,325 cubic feet. The habitable zones in independent accent embodiments equal but not limited to 13,750 cubic feet. The habitable zones are further increased in drone booster assisted accent launches as illustrated in the preferred embodiment. The total preferred embodiment design guideline is but not limited to a total craft volume of 57,000 cubic feet. The centripetal aerodynamic platform space craft embodiment can be configured to reach Earth orbit independently or attached to heavy lift boosters.

According to the invention, when the heavy lift launch system structure is seen on the launch pad from ground level it includes:

At least one centripetal aerodynamic platform space craft lift body envelope attached to a central reusable solid or liquid fuel drone rocket booster.

And two such centripetal aerodynamic platform space craft for deep space missions attached to a stage two central reusable liquid fuel drone booster rocket saddled and flanked by twin stage one solid fuel reusable drone booster rockets.

The centripetal aerodynamic platform spacecraft are in upright position with turbo jet launch assist system exhaust face down, effectively allowing the shuttles to carry their own weight at launch, reducing the required liquid oxygen and related booster tank capacity weight during the initial launch.

The heavy lift launch system consists of launch pad components and infrastructure that tilt the serviced reusable booster rockets and centripetal aerodynamic platform spacecraft into launch position. Two centripetal aerodynamic platform spacecraft, lighter than the retired space shuttle can be launched together with onboard turbojets and drone booster assist. Two saddled jet assist shuttles reduce cost on heavy lift mission launches beyond Earth orbit. The embodiment's, 17 foot high main body within approximately a 90 foot diameter is actually shorter and less in height on the launch pad than the retired space shuttle, yet has greater volume capacity and less in empty weight at but not limited to 125,000 pounds per shuttle. The 38 to 40 foot radius fuel storage ring at 5,900 cubic feet or 44,135 gallons, at 156,169 pounds provides the independent fuel source of liquid methane. In addition 2,100 cubic feet or 15,709 gallons of fuel and oxidizer reserve can be stored in the lower body and staging bay. Liquid methane weight is 3.538 pounds per gallon. Jet fuel weight is 6.8 pounds per gallon. A total of 8,000 cubic feet of wing and body oxidizer and fuel storage, or a 59,844 gallons capacity is illustrated in cross sections. The 59,844 gal×3.5 lbs+6.8 lbs/2 or average 5.15 pounds per gallon or 4.5 pounds per gallon, yields a total fuel weight of 269,298 pounds. The centripetal aerodynamic platform space craft weight is 125,000 pounds. The design standard payload weight is but not limited to 65,000 pounds. The total preferred embodiment weight lifted by turbojet assist and vertical launch boosters thrust is but not limited to 459,298 pounds or 460,000 pounds per centripetal aerodynamic platform spacecraft.

The shuttle rear cargo bay doors are conveniently lower to the launch pad than conventional heavy lift systems. Service support and loading support infrastructure allow all shuttles and booster drones to be serviced horizontally in industry standard hangers. Attached to drone boosters the aerodynamic platform spacecraft turbojet assisted launch is followed by brief shuttle afterburner/rocket power transitioning to a scramjet phase in the upper atmosphere followed by shuttle assist rocket power to orbit.

The two stage drone booster system provides but not limited to: Stage one, 2,800,000 pound feet of thrust per solid rocket booster, for a 125 second burn and stage two, 4,500,000 pound feet of liquid oxygen and liquid hydrogen thrust for a 500 second burn. Orbit velocity is reached at 2.5 to 2.7 exhaust velocity. Total initial launch thrust provided by boosters is but not limited to an initial 10,100,000 pound feet. The jet assist from two saddled shuttles' main engines provide (62,500 lbf×4 engines), 250,000 pound feet of additional thrust. The stage two delta three core boosters are powered down after initial lift off to conserve fuel for the stage two accent. Residual fuel can be transferred to shuttles before the central stage two drone returns to Earth. The empty drone design weight goal of each attached stage one twin solid rocket booster is but not limited to 130,000 pounds each. The center stage two, three core solid and or liquid hydrogen fuel with oxidizer drone's empty design weight is but not limited to 116,000 pounds. The stage one and two drone boosters land horizontally on an airstrip and are serviced for reuse. Vertical takeoff is more fuel efficient at initial launch for heavy lift launches. Horizontal landing conserves fuel for accent and offers landing site options.

BRIEF DESCRIPTION OF THE DRAWINGS

FIG. 1 is a perspective view of one centripetal aerodynamic platform spacecraft within earth's atmosphere during reentry or during service runs. The view illustrates the aerodynamic and stealth properties of the invention. The balanced circular configuration to be described in further detail is the preferred embodiment of the present invention;

FIG. 2 is a cut away isometric front port side view showing one alternate plan A with a center of gravity based aerodynamic embodiment, illustrating interior flexibility of the flight deck, support area floor plan, engine locations, cargo bay and the 1G corridor of FIG. 1; and FIG. 3 is a front profile view of the aerodynamic platform spacecraft of FIG. 1.

FIG. 35 is a cross section showing one embodiment front starboard quarter A-A view and rear portside quarter B-B view illustrating two center fixed cargo bay levels around which is a continuous fixed loop centripetal rotating gravity corridor within one alternative wide body plan E; and FIG. 35a Longitudinal cross section of the embodiment showing interior and bottom flush stealth recessed ring wing; and FIG. 36 is a top view showing one alternate wide body plan E showing another center of gravity based aerodynamic embodiment capable of compression lift at hypersonic speeds, illustrating interior flexibility, reduced body surface area, massing, weight, a two level cargo bay and the preferred 1G corridor embodiment of the invention; FIG. 36e Top view of preferred embodiment with front pilots glass and upper crew passenger glass adjacent to vertical lift jet air intakes. Rear upper hatch doors shown at rear. The embodiment is symmetrical to facilitate even rotation; and FIG. 36f Bottom view of preferred embodiment with two front engine intakes and vertical lift jet and or rocket exhaust with closing single hinge flaps.

DETAILED DESCRIPTION

Referring now to the invention in more detail, in FIG. 1 there is shown an aerodynamic platform spacecraft, 10 with stealth properties.

Figure 29:
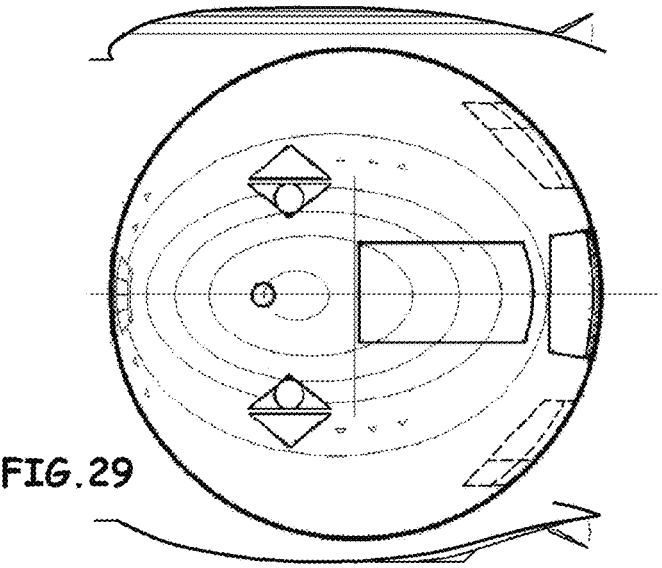
FIG. 29 is a top exterior surface view of the aerodynamic platform space craft in FIGS. 1, 2, 3, 4.

Referring now to the invention in more detail, in FIG. 2 there is shown an aerodynamic platform spacecraft, 10 having a circular centripetal rotating gravity corridor or corridors, 12 held in a substantially curved vertical position elevated or at right angle above the floor deck by an aerodynamic body, namely a lifting body, 10, a ring wing or similar under carriage wings, 16 and internal to the lift body two parallel engines, 18. The aerodynamic platform spacecraft has the ability to enter space on its own power with new industry inline hollow core turbojet-scramjet-rocket engines with shared intake and exhaust shown in FIG. 29. Two vertical lift hybrid turbojet rocket engines, 20 provide front vertical lift. Each of the components, 10, 16, 18, 20 is attached to the internal 1G producing centripetal corridor, 12 within the aerodynamic lifting body, 10 capable of dependent or independent atmospheric or space flight near or without reusable launch assist systems, 40.

In more detail, still referring to the invention of FIG. 2, the aerodynamic platform spacecraft, 10 is sufficiently optimized wide and long to enclose a centripetal corridor for work, sleep zones and pilots cockpit, such as in or about 66 feet in diameter and about 6 to 15 feet wide. The aerodynamic platform spacecraft body, 10 is efficient and consequently circular with a diameter of 90 feet within or without limitations. Elements, 14, 16, 18, 20 are sufficiently arranged within a 17 foot height without limitations or as defined by aerodynamic requirements to create a shell of habitable zones. Engines, 18, cockpit, 14 and payload bay, 15 are within a total approximate main body height of 17 feet more or less. The lower ring wing, 16 can be raised or lowered at landing or in flight.

The construction details of the embodiment as shown in FIG. 2 are that the aerodynamic platform spacecraft, 10 may be made of aerospace industry materials or of any other sufficiently rigid and strong material such as titanium or aluminum lithium skin, carbon-carbon composites or carbon graphite epoxy resin over 2 inch thick aluminum honey comb skin along non-landing bearing surfaces. Reentry surfaces such as leading edges are heat resistant carbon-carbon composites and the craft underbelly is covered in but not limited to heat resistant tile or other lightweight heat resistant silicon carbide fibers within glass matrix skin materials capable of withstanding 1,000 to 3,000 degree reentry temperatures. Further, using high-strength composites, metal, and the like the various structural and electronic components of the aerodynamic platform spacecraft 10 can be made of different materials. The embodiment can be de-orbited, re-entered and landed with airplane like functionality and utility. See the preferred embodiment example FIG. 36, in which FIG. 2 and FIG. 3 both show a first version, FIG. 4 show a second version, and FIGS. 30, 31, 32, 33, 35, 36 show a third, fourth and fifth preferred version.

Figure 4:
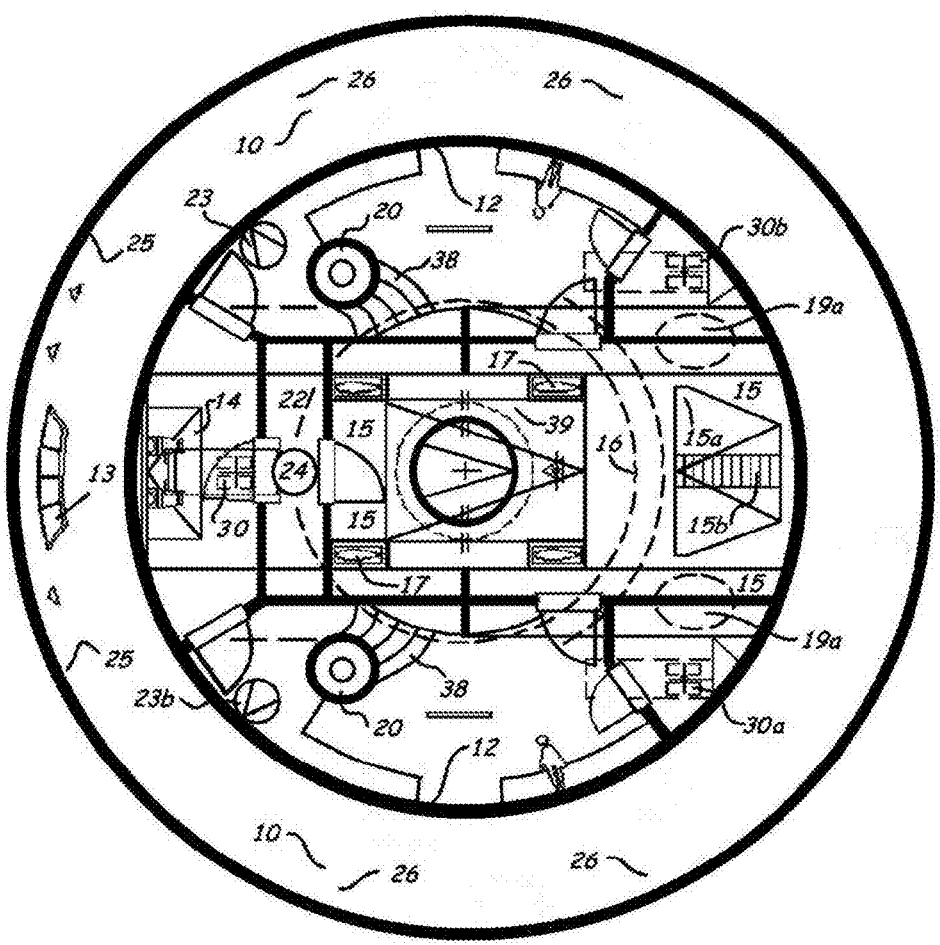
FIG. 4 is a top view showing one alternate plan B showing a center of gravity based aerodynamic embodiment, illustrating interior flexibility of the flight deck, support area floor plan, engine locations, cargo bay and the 1G corridor of the of the invention.

Referring now to the invention shown in FIGS. 2, 3, and 4 the aerodynamic platform spacecraft, 10 is sufficiently optimized wide, thick and long to enclose a circular centripetal 1G rotating gravity corridor, 12 within a reentry and flight worthy envelope.

The front of the invention preferably consists of industry standard cockpit window glass, 13 with sightlines familiar to most pilots but may be of alternate configuration, nonexistent or augmented by internal visual array monitor systems.

Two triangular or curved side air intake, 18a are covered by recessed hinged triangular variable length sided, heat resistant protection doors, 19a to protect sensitive oxygen intake variable volume elements, 19. The triangular intakes, 18a are triangular to allow maximum air intake with a single sided hinged doors, 19a. The hinges, 85 on only one side reduce mechanical closing mechanisms. The flat triangular shaped door, 19a configures to a curved body recess, 19b and the door, 19a is partially self-closing, self-securing during reentry. Not located on remote nacelles, the doors can be closed manually. The door shape reduces bulges on the multi-curved surface area of the embodiment, 10.

The ring shaped wing, 16 preferably is circular configuration. The circular aerodynamic wing, 16 shape tapers from front to sides and realigns to standard wing profile along its rear. This embodiment of the invention eliminates long wing spans beyond the lifting body yet provides added lift and stability.

Four vertical struts, 17 supporting the ring shaped wing, 16 are fixed or hydraulically raised during stealth flight. The struts serve several purposes. They provide vertical stabilizer capability during glide path reentry and balance the embodiment's center of gravity. The struts, 17, are aerodynamically shaped similar to normal aircraft vertical stabilizer, however four are used. When raised the struts are stored in the cargo bay, 15 area. This provides easy access for maintenance and repairs within the lifting machinery cabinets, 17a.

Referring now to the invention plan B shown in FIG. 4. Much of these items will be discussed later in greater detail. The embodiments of the invention's machinery components function as follows: Cockpit glass, 13, is located to serve a defined forward cockpit pilot zone, 14 with reclining seats and or floor. The cargo bay, 15 is centrally located above the lower body ring wing, 16. The ring wing, 16 is supported by vertical struts, 17 that are hydraulically lifted into the vertical struts machinery cabinets, 17a into the central cargo bay, 15. The cargo bay, 15 has a rear ramped door, 15a of one or more components with incorporated rear entry ramp stair, 15b. Two parallel horizontal turbojet-scramjet-rocket engines, 18 run from front to rear. Rear horizontal engine exhaust flaps and pivot mechanisms, 19a angle down to provide rear vertical thrust. Two front turbojet-rocket engines 20, provide front vertical lift during vertical takeoff maneuvers or short run way conditions. Decompression air lock, 22 located between the cargo bay, 15 and the forward pilots' cockpit zone, 14. Forward starboard, 23a and portside, 23b bottom side, exits have interior and exterior doors serving as decompression access tubes. Forward top access hatch, 24. Leading wing edge, 25 having heat resistant materials. Fuel storage, 26 with Methane and Co2 gas inlets leading to fuel fabrication equipment. Portside rear landing gear, 30a. Starboard side rear landing gear, 30b. Center front landing gear, 31. Stepped ramp at level change 38. Cargo bay, 15 with adjustable inclined ramp floor 39.

Referring now to the invention shown in FIGS. 4, 31, 33, 35, 35a and 36. The sleep work zones along the 1G corridor, 12 when on an airstrip or in a horizontal flying mode can still be used as horizontal habitable zones with the pilot's cockpit, 14 at the front portion of the vehicle plan. The pilot's seats recline 90 degrees. The cargo bay, 15 in the center has the advantage of a rear lower boarding door, 15a, 15b or ramp with stairs. This design component is not in other space exploration reentry or reusable vehicles.

Referring still to the invention shown in FIGS. 4, 31, 33 and 36. Three standard double wheel landing gears, 30, 30a and 30b are shown one below the cockpit, 14 and the other two are at rear port 30a and rear starboard 30b typically serving aircraft.

Figure 5:
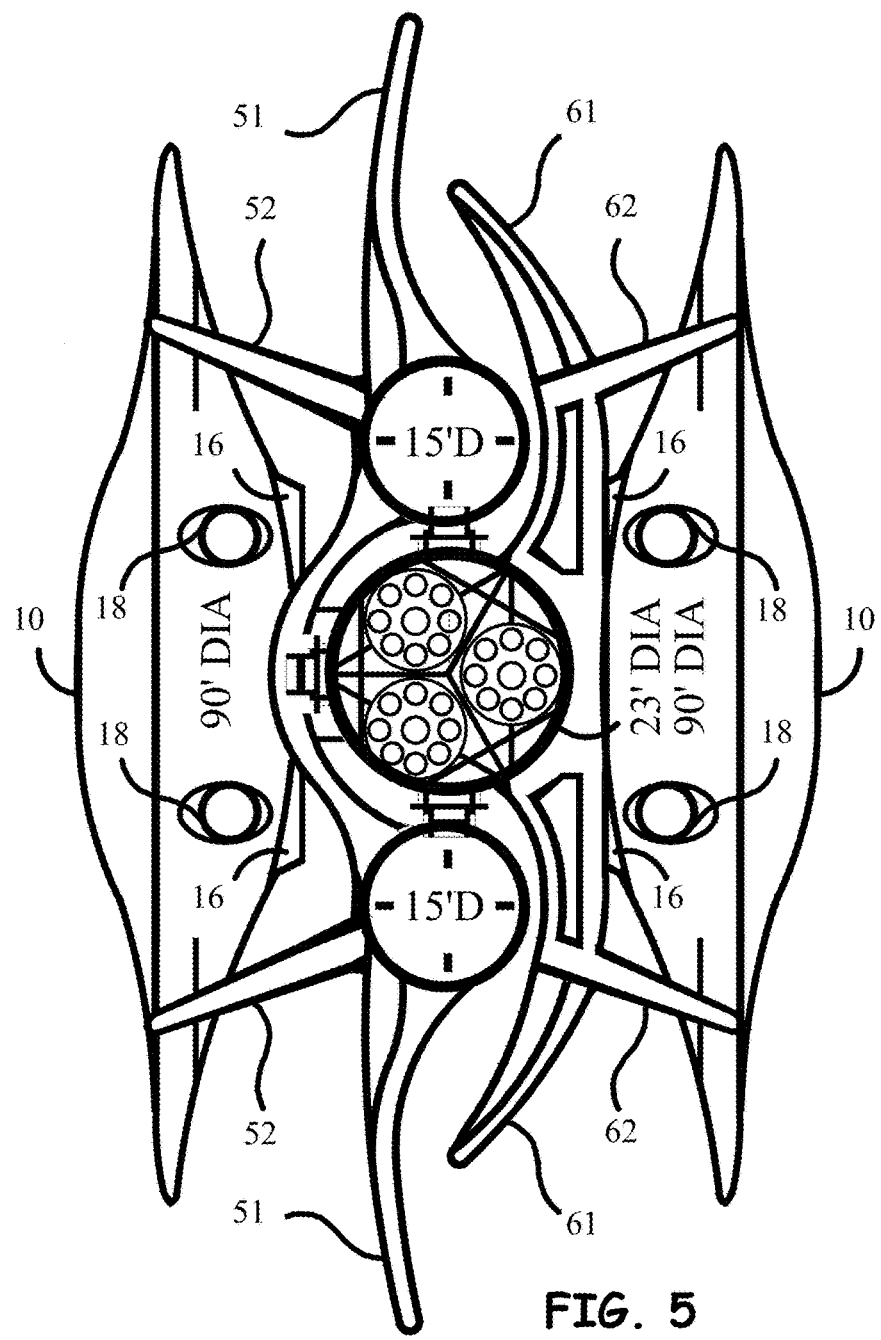
FIG. 5 is a cross section pre-launch plan view showing the diameter of the stage one twin booster assembly and stage 2 center booster supporting two circular saddle launched centripetal aerodynamic platform spacecraft of FIGS. 4, 10, 31, 33 and 36.

Referring now to the invention shown in FIG. 5. In this cross section view the diameter of the stage one twin booster assembly, 50 and stage 2 central booster assemblies, 60 are shown. The diameter of the solid fuel stage one boosters, 50 is 15 feet each and the stage two booster core, 60 diameter is 23 feet. The diameters indicated are not limited to these dimensions. The dimensions illustrate the volume of fuel required in cross section to reduce the vertical height of the boosters. The stage one attached twin solid fuel booster rockets, 50 heights are preferably 135 feet. The stage two, three booster core is a liquid hydrogen, liquid oxygen, variable thrust booster rocket, 60. The height is preferably 218 feet having, but not limited to three internal, structural spine warren trusses in a delta configuration. The spine forms but not limited to three booster fuel and oxidizer chambers in delta formation, each have multiple failsafe engine clusters at the base. The stage one and two booster lengths are preferably minimized to maintain efficient aerodynamic and structural integrity in horizontal return flights. The two stages are coupled on the launch pad. The central stage two booster rocket, 50 supports two preferably circular saddled aerodynamic platform spacecraft, 10 during launch. The two saddled aerodynamic platform spacecraft, 10 using surrounding oxygen provide jet assist at launch. The stage 1 twin boosters during heavy lift launches provide the first 70 vertical miles of launch assist following stage 2, the final 50 miles of vertical accent. The launch apogee range from but not limited to 115 to 125 miles. The stage 1 attached twin boosters, 50, utilize 5 recessed 4 wheel bogie carriages, 54 and 55 to slip downward at stage separation between the separation guide rail slip tracks 53. The slip tracks run down the two sides and rear end top of the stage 2 central booster. 50. The central booster, 60 carries the ring shaped wings, 16 of two saddled aerodynamic platform spacecraft, 10. Stage one booster wings 51 and stage two booster wings, 61 are curved to minimize wing spans on the launch pad, assist in low fuel returns, and return vortex lift glide path aerodynamics. Stage one twin boosters rear vertical stabilizers, 52. Stage two central booster rear vertical stabilizers, 62.

Figure 6:
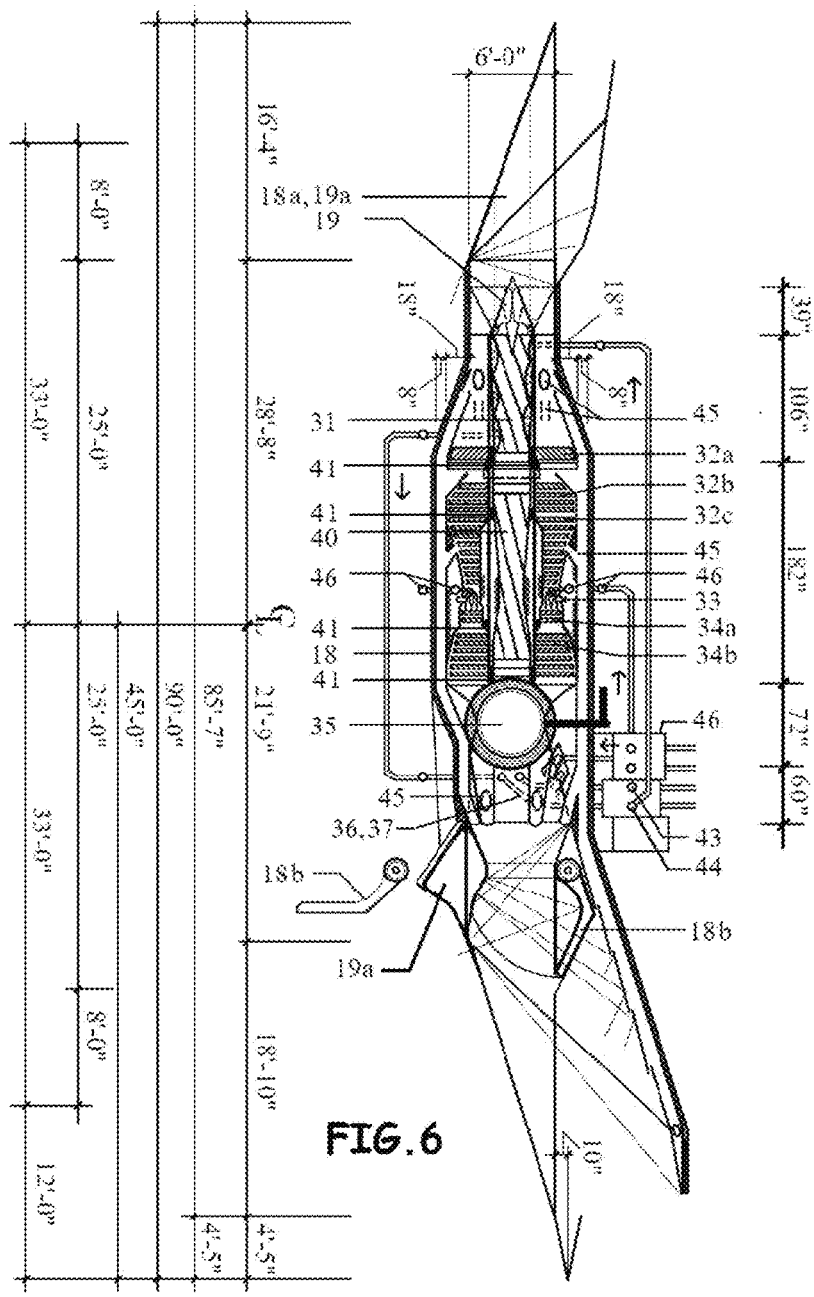
FIG. 6 is a cross section of one of two parallel rear directional thrust horizontal engines of the invention illustrating common front variable volume directional intake, a hollow core twin axle turbojet engine and shared common rear after burner, scramjet and rocket engine combustion chamber.
Figure 37:
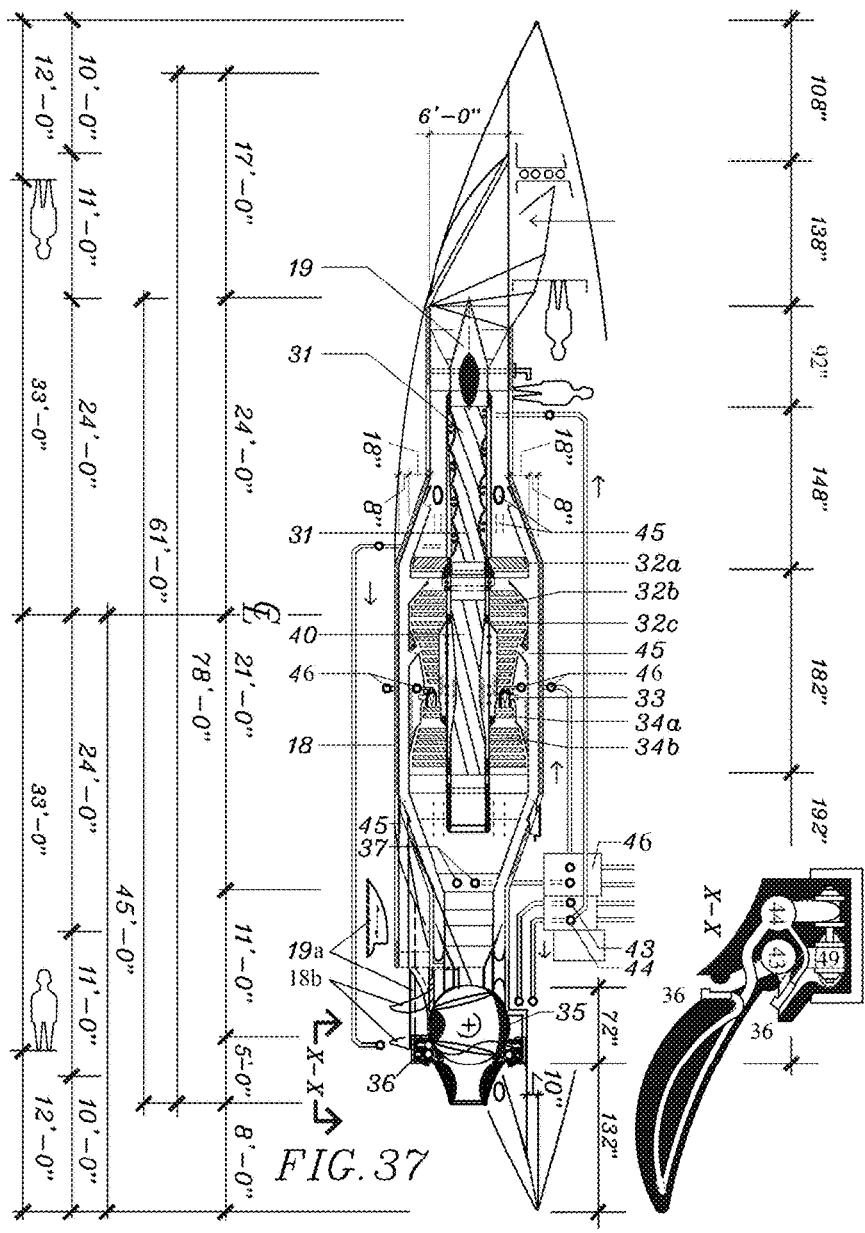
FIG. 37 is a side section view of the hybrid hollow core, turbojet-scramjet-rocket engine with duel annular afterburner and aerospike manifolds thrusters within a rear pivoting, exhaust thrust nozzle. The engine, in this configuration, is shown with but not limited to this length or component arrangements to have a slightly longer pre-cool unit and a longer air mixing chamber. The rear engine nozzle is shown at a larger enhanced scale to graphically show the duel manifold aerospike engine shown in FIG. 37 with better 2D clarity. The hollow core hybrid engine is an elongated version. Here the prototype engine is designed to fit precisely within but not limited to the preferred embodiment. The Hybrid Hollow Core, Turbojet-Scramjet-Aerospike-Rocket Engine primary thrust flame exit is located further to the rear rather than underneath the embodiment when compared to other scramjet craft, reducing underbody flame exposure and allowing a larger and longer flame tail. The ball valve can also be rotated 360 degrees to close off the turbojet scramjet machinery from the rear rocket engine. The rotating ball valve interior scramjet and turbojet exhaust air conduit walls are slightly curved to facilitate air flow downward when the rear aerospike rocket engine is pivoted 90 degrees. The aerospike rocket engine attached to the exhaust nozzle can be but not limited to a pivot of 90 degrees around the rotating ball valve eliminating additional rear thrusters for vertical takeoff and landings.
Figure 37A:
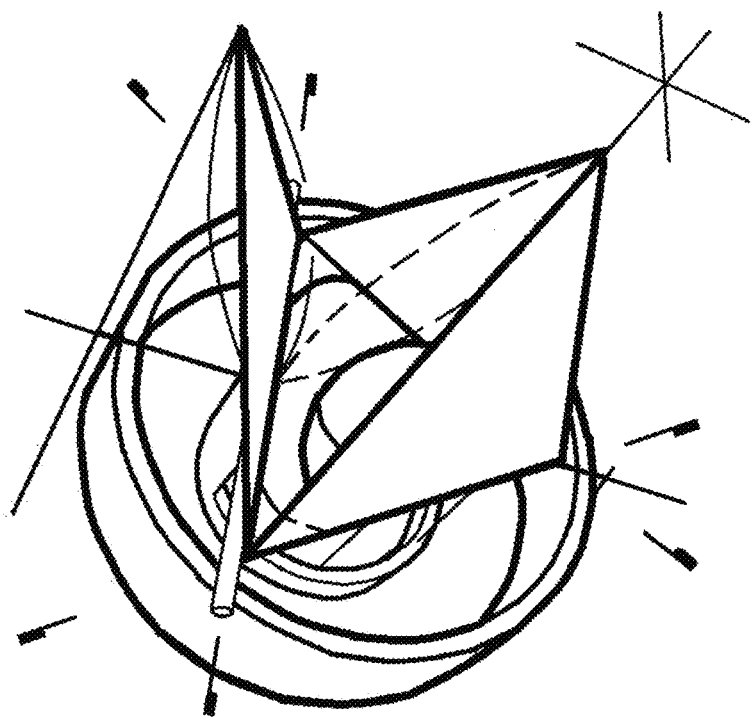
FIG. 37a, is a front view of the engine variable volume air intake with one of three flaps fully open.
Figure 37B:
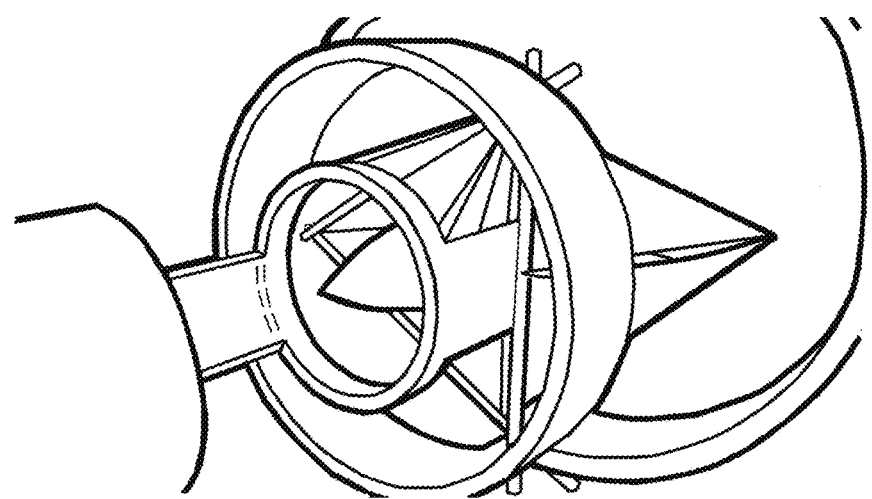
FIG. 37b, is a rear view of the variable volume scram jet air intake air flow diverter.
Figure 37C:
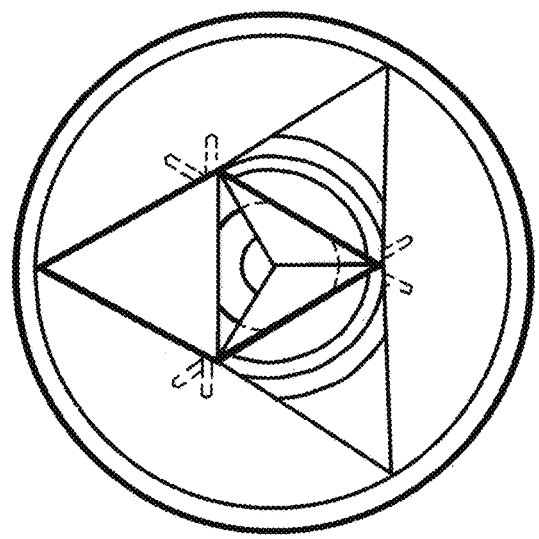
FIG. 37c, is a front view of the variable volume air intake. Two of three flaps when closed divert air to the turbojet engine beyond.
Figure 37D:
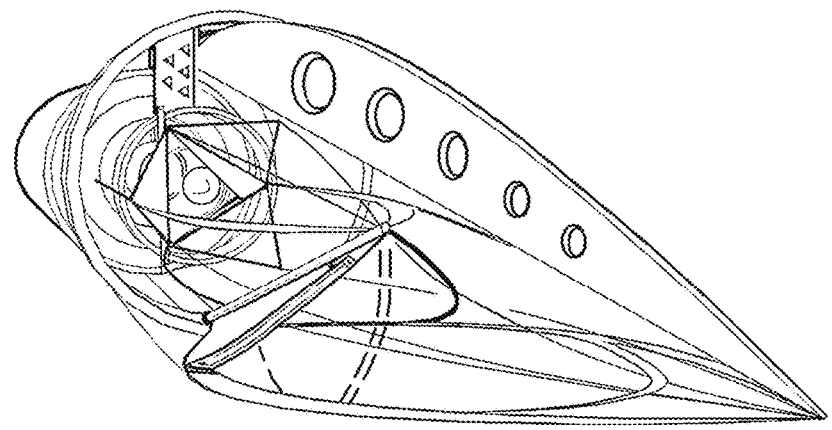
FIG. 37d, is a front cutaway view of the engine protection door location air intake showing three triangular hinged flaps on the variable volume air intake front view.
Figure 37E:
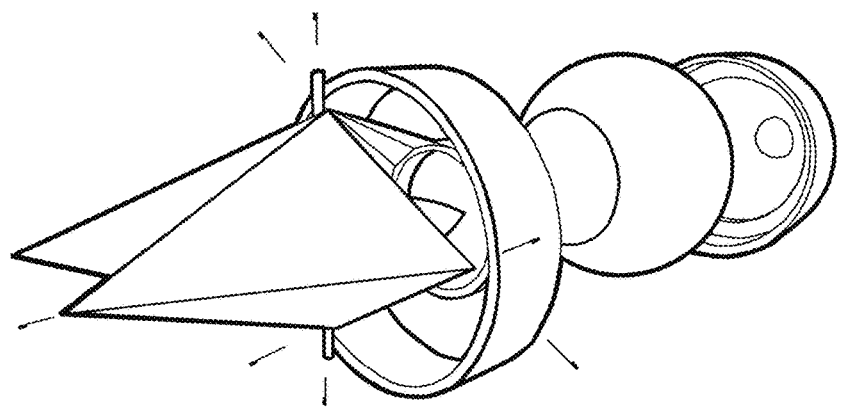
FIG. 37e, is a front side view of the variable volume air intake component, (Air Pre-cooler Unit & Turbojet Engine Not Shown), with rotating but not limited to 6 foot diameter ball valve having a 3 foot-6 inch diameter channel, leading air and turbojet exhaust to the interior afterburner/scramjet combustion chamber.
Figure 37F:
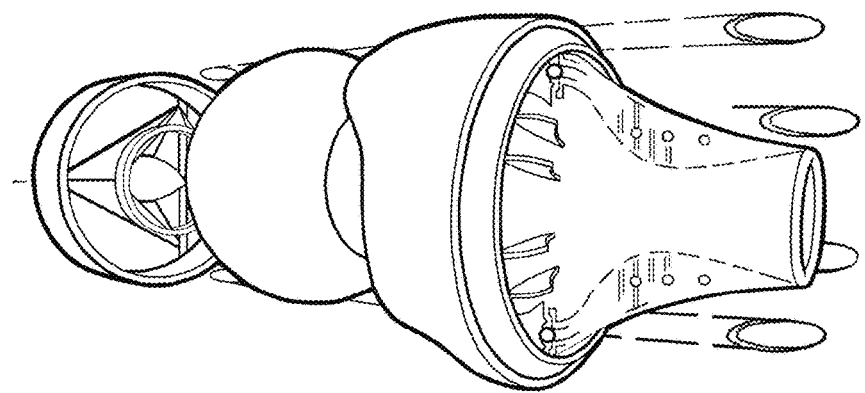
FIG. 37f, is a rear side view of the front variable volume air intake components, bypass pipes, ball valve, leading air and turbojet exhaust to the annular interior thrust cells manifold number1 serving the afterburner/scramjet combustion chamber. The open ended aerospike nozzle is fuel cooled before the expanding fuel is sent to pre-burn units. The annular exterior thrust cells manifold number 2 cover is shown serving the aerospike engine circular cone exhaust nozzle surface. The pre-burn hot gas, turbo fuel and oxidizer pump exhaust units lift efficiency fins are shown.
Figure 37G:
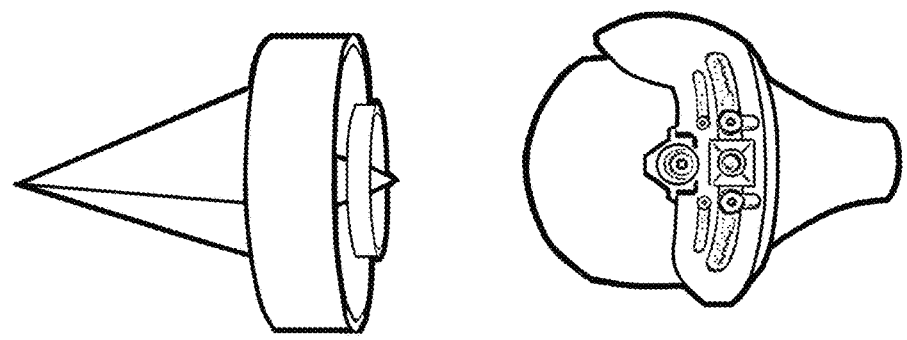
FIG. 37g, is an engine component side view of the variable volume air intake, (Air Pre-cooler Unit & Turbojet Engine Not Shown). The ball valve can be closed during the annular interior manifold 1 and annular exterior manifold 2 thrust cell aerospike rocket engine exhaust.
Figure 37H:
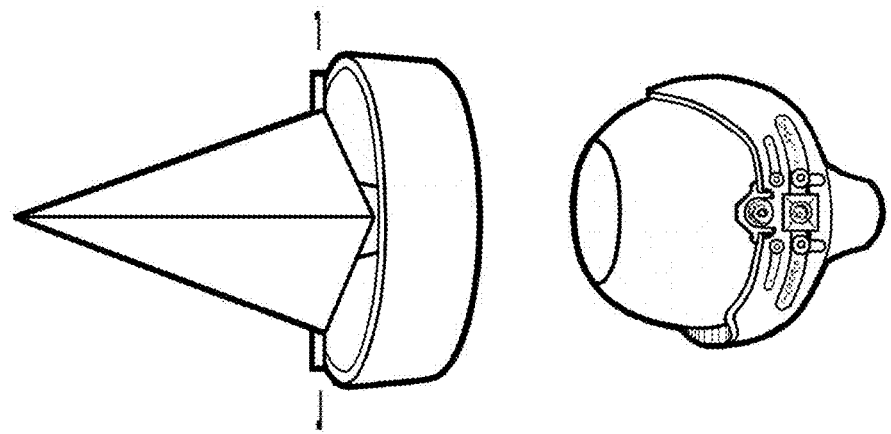
FIG. 37h, is an engine component side view of the variable volume air intake closed, (Air Pre-cooler Unit & Turbojet Engine Not Shown), the turbojet is engaged. The ball valve is open in the turbojet engine exhaust configuration. The inner after burner/scramjet annular thrust cell mixing manifold number 1 and combustion chamber with interior open ended expansion nozzle can be used with or without the annular aerospike mixing manifold 2.
Figure 37I:
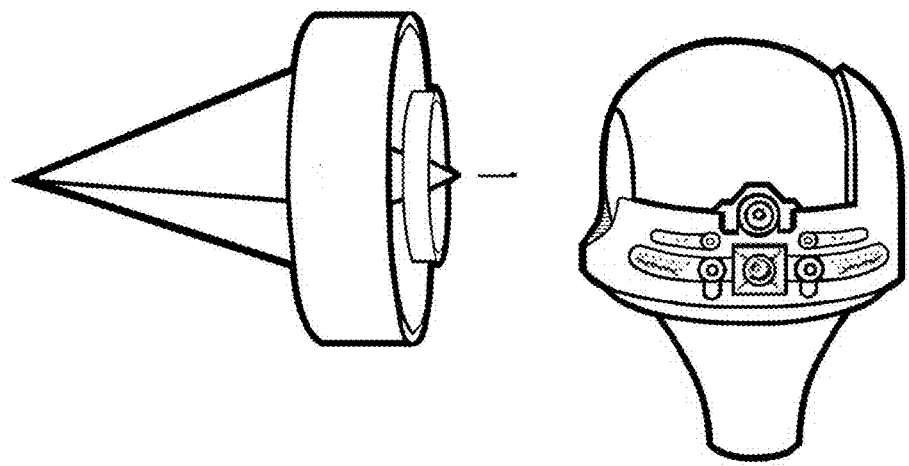
FIG. 37i, is an engine component side view of the variable volume air intake closed to scramjet air, (Air Pre-cooler Unit & Turbojet Engine Not Shown), the ball valve is closed. The inner afterburner/rocket engine combustion chamber with integral exterior aerospike annular engine exhaust nozzle is rotated 90 degrees for vertical take-off and landings.

Referring now to the invention shown in FIGS. 6 and 37. In this cross section view one of two horizontal engines 18 is shown. The inline hybrid turbojet-scramjet-rocket engine, 18 consists of variable volume air intake elements 19, a 106 inch length supersonic air cooling elements 31, followed by a 182 inch hybrid engine of compression fans 32a, low compression blades, 32b, high compression blades 32c, jet 5.5 foot diameter combustion chambers 33, high rotation pressure turbo components 34a, low rotation pressure turbo components, 34b, 360 degree rotating ball valve turbo and scramjet air flow regulator chamber, 35 and hybrid scramjet-rocket combustion chamber, 36 with after burner 37. Air is sent toward the outer engine shell typical of conventional jet engines to perimeter jet combustion chambers, 33. In this engine embodiment scramjet supersonic air or magnetized channeled plasma chemical engine propellant can be diverted through the center rotating hollow core tapered chamber air conduit, 40, of the turbojet engine to rocket engine, 36 and afterburners, 37, in oxygen rich atmospheric conditions. The preferable embodiment consists of turbojet elements, with but not limited to a 30 inch diameter hollow core internal pipe shaft walls, 40 transitionally tapered to accommodate scramjet supersonic air flow through the center line of the hollow core, 40. Front jet fan, 32a. Low compression blades, 32b. High compression blades, 32c. Air bleed valves and ports, 45. The rotating turbojet compression fans, 32 and turbo components, 34, are supported by but not limited to four thrust bearings, 41 and or electromagnetic ring ball bearing turbo shaft support points, 41. One fan hollow core, 40 shaft bearing point, two mid double hollow core, 40 shaft bearing points and one turbo end hollow core 40 shaft bearing point. A higher speed outer rotating, compressor-turbo hollow core, 40 pipe shaft surrounds a lower speed inner counter rotating fan-compressor-turbo hollow core, 40, pipe shaft. The turbo components, 34 leads jet combustion air to the 360 degree rotating ball valve turbo and scramjet air flow regulator chamber, 35. The 360 degree rotating ball valve air flow regulator chamber, 35 is shown in closed position during rocket engine combustion chamber, 36 use. The 360 degree rotating ball valve air flow regulator chamber, 35, airlocks the turbojet and scramjet elements, 34 and 40 from the rear inline rocket engine combustion chamber, 36 during long rocket engine burns or in hazardous or vacuum environments. The transition from turbojet to scramjet to rocket engine occurs after a brief after burner jumps in thrust. The 360 degree closing transitioning ball valve, 35 as it closes delivers further compressed oxygen rich scramjet speed air to the transitioning liquid oxygen elements, 43 and fuel mixture elements 44. The ball valve, 35 closes the forward end of the rocket engine, 36.

Still referring to the invention shown in FIGS. 6 and 37 in greater detail, the lifting body, 10 front aerodynamic profile is tapered to decrease air shock waves as it enters the front of the rear thrust engine 18. The triangular shaped sloping open engine door recess pocket, 19b of carbon-carbon composite materials are designed to partially slow and divert hot supersonic air up, over and around the fuselage 10. The variable volume air intake elements 19, further deflects supersonic air shockwaves during turbojet and scramjet phases of the engine cycle receiving oxygen from the atmosphere rather than using stored liquid oxygen. Three, three sided variable volume air intake elements, 19 divert, regulate and transition air flow through the front cooling coil heat exchangers, 31 to the turbojet compression fans, 32, and or the center spinning hollow core tapered chamber air conduit, 40. The front supersonic air cooling heat exchangers 31 circulate heat absorbing liquid methane before it reaches the scramjet-rocket engine combustion chamber, 36. The rotating, hollow core tapered, air conduit chamber, 40 cools the outer carbon-carbon turbojet engine components, 32 and 34 from the interior, allowing higher rpm. In scramjet mode the outer spinning turbojet engine components, 32 and 34 cool and dissipate heat. Independently regulated, tapered, rear directional carbon-carbon air bleed vents, 45 for by pass air surround the inner layer of the two layer engine shell, 18 to reduce heat fatigue, cool the engine, reduce drag and channel excess air to the rear combustion after burner chamber, 37 producing additional thrust capacity during jet assisted launch. The elongated inline hybrid turbojet-scramjet-rocket engine 18 when compared to conventional jet engines has increased single extruded component carbon-carbon compression elements, 32a, 32b, 32c and carbon-carbon rear turbo elements 34a and 34b. Turbojet stages are but not limited to compression stages 1:4:9 plus turbo stages 2:6. In this engine embodiment the rotating hollow core tapered chamber air conduit, 40 consisting of titanium and carbon-carbon composite. Slightly spiraled, tapered inward facing core walls at the engine center axis reduce air shock waves leading to the revolving ball valve chamber, 35 linked mechanically and electronically to the engine rotation. In closing impulse cycles the air is slightly compressed making it more oxygen rich and slower before it reaches the rear hybrid after burner flames, 37 of the scramjet-rocket combustion chamber 36. The hybrid scramjet-rocket combustion chamber, 36 consists of a three sided rear open pointed pyramid igniter surface, afterburner, 37 and directional exhaust, 18b and bottom rear vertical exhaust door, 19b. Liquid oxygen elements, 43 and liquid methane fuel lines, 44 and liquid jet fuel lines, 46 are conveniently serviced from inside the cargo bay. The inline hybrid turbojet-scramjet-rocket engine, 18 is powered by a mixture of atmospheric oxygen, liquid jet fuel, liquid methane and liquid oxygen supplied at launch and later fabricated by on board methane fuel recovery system 27 and liquid oxygen recovery systems, 28. The on board oxygen and methane fuel manufacturing systems 27, 28 are discussed later. Oxidizer and fuel will be completely in the gas phase before they enter the combustion chambers. The turbojet engine location within the aerodynamic platform spacecraft embodiment is not limited to a single location(s) and can be above, below, surround or flank scramjet air flow channels. Engine configurations are not limited to the preferred inline hybrid turbojet-scramjet-rocket engine, 18. Oxidizes channeled through the central hollow core, 40 and pulse ball valve, 35 to the rear inline rocket engine combustion chamber, 36 and afterburners, 37 then ionize gaseous state fuel generating magnetized plasma burst. The preferred inline hybrid engine embodiment reduces the number of engines, multiple engine compartments, and engine size and engine weight to thrust ratios. The engine intake and exhaust are protected preferably by triangular envelope doors, 19a. The adjustable angle rear thrust, 18b and bottom rear vertical thrust engine, 20 door, 19a of the preferred two engines, 18 are adequate for the aerodynamic platform spacecraft to achieve rear starboard vertical lift and decent in atmospheric conditions and when in rocket engine phase, twin engines serve as maneuvering rockets. The oxygen powered engine produces 30 megawatts of electrical power with 7 megawatts above 70,000 feet supplemented by industry standard hydrogen fuel cells. The thrust from the preferred two engines, 18 are adequate for the aerodynamic platform spacecraft to reach orbit.

Figure 7:
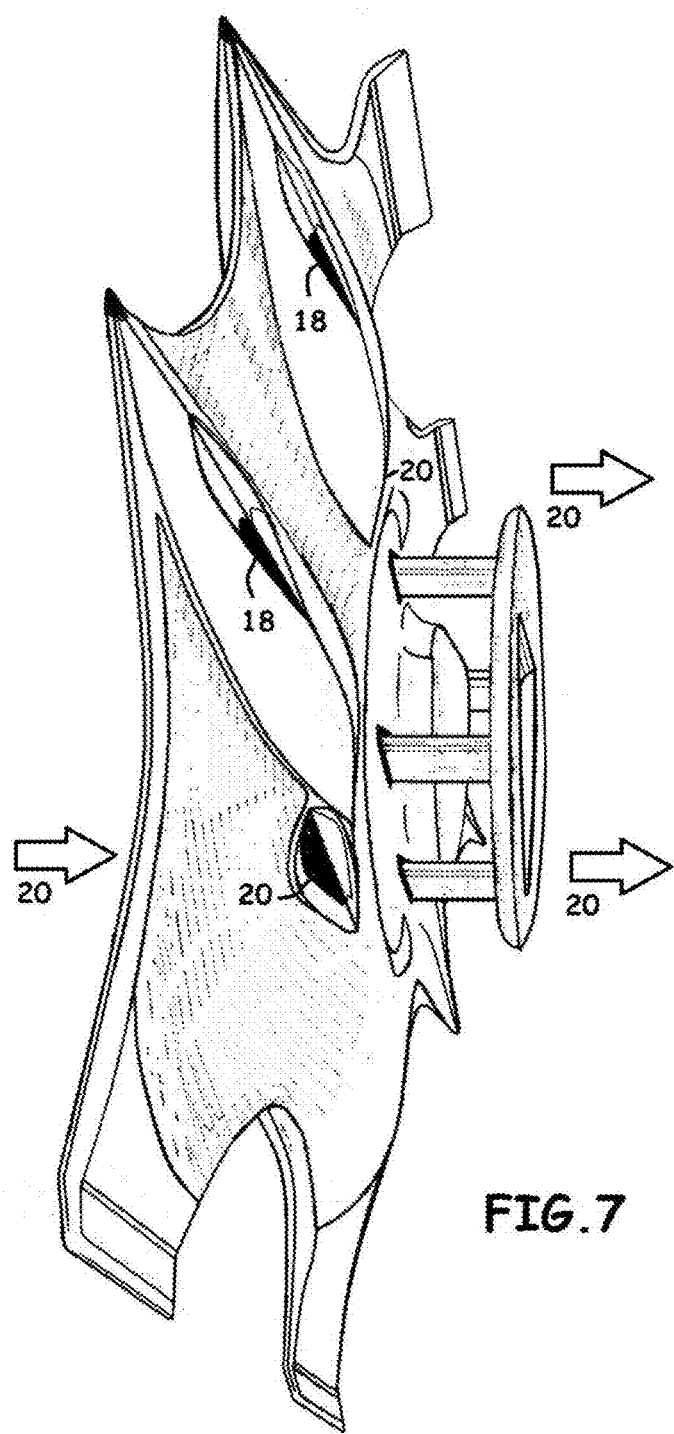
FIG. 7 is a front starboard perspective view illustrating the location of two vertical front lift engines of the invention.
Figure 8:
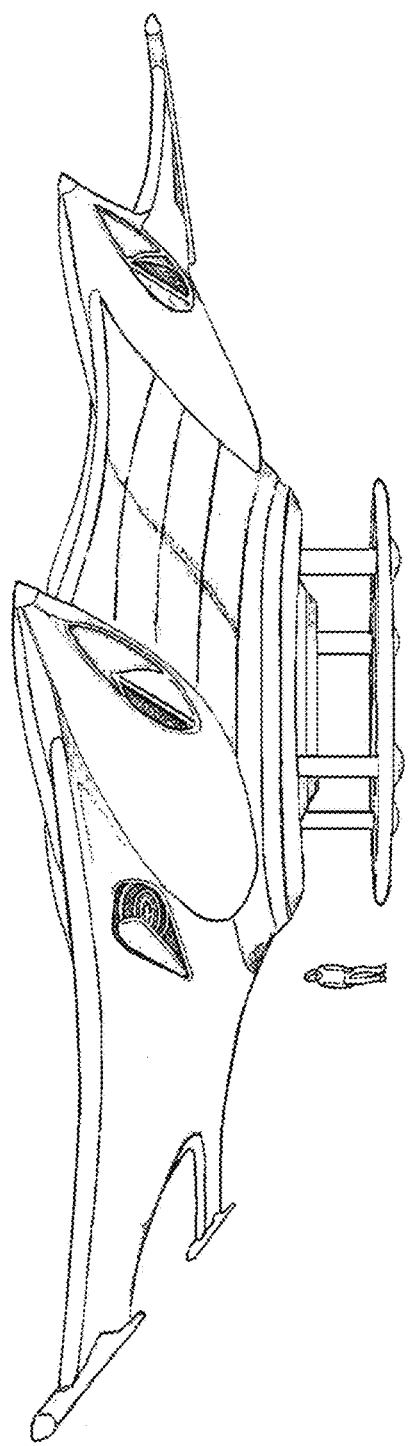
FIG. 8 is a front starboard side perspective view of the aerodynamic platform space craft of FIG. 36 illustrating the recessed single hinge reentry engine protection door for each engine leading to the variable volume air intake, scramjet air pre-cooler unit, and or the turbojet engine with bypass and center axis hollow core scramjet air conduit.
Figure 9:
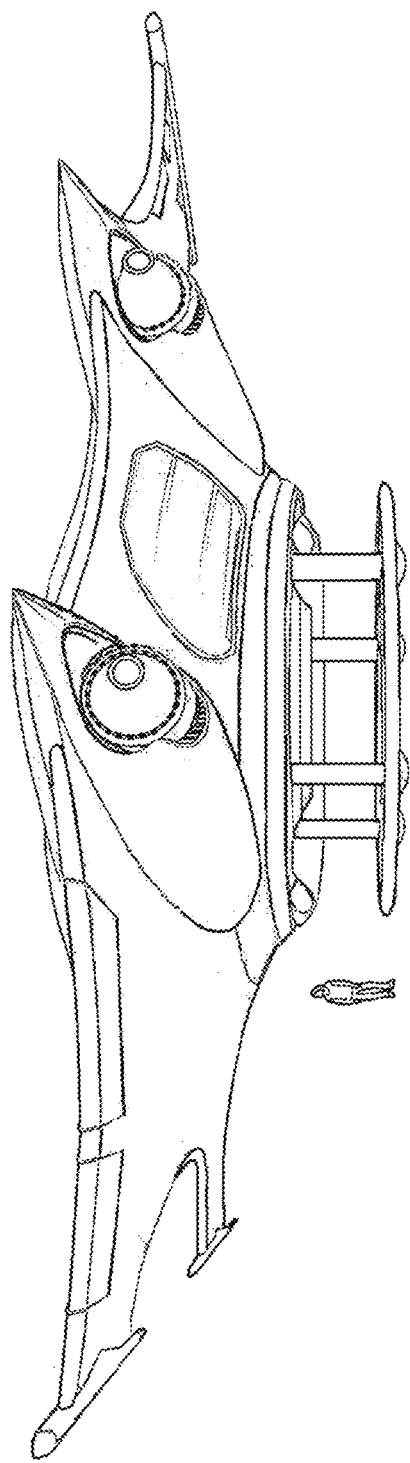
FIG. 9 is a rear port side perspective view of the aerodynamic platform spacecraft in FIG. 36. Two engines are shown. The independent 360 degree rotating ball valve opens or closes air flow to the 90 degree rotating rear engine afterburner/scramjet/rocket engine combustion chamber nozzle. The nozzle is cooled by thermal expanding fuel routed to the pre-burn hot gas turbo units/fuel and oxidizer perimeter pumps. The duel, open end, nozzle outer annular aerospike exhaust thrust cells burn surface is shown in the horizontal flight position.

Referring now to the invention shown in FIG. 7. In this cross section view two vertical or sloped engines, 20 are shown. The inline hybrid turbojet-rocket engines, 20 consists of a solid axle, turbojet engine 20 producing vertical lift air flow from top to bottom through jet engine combustion chambers, 33, turbo components and lower ball valve jet engine exhaust chamber, 35. Jet thrust is sent through the lower inline rocket engine combustion chamber, 36 to afterburners, 37 in oxygen rich atmospheric conditions. The transition from jet to rocket engines occurs after a brief after burner, 37, jump in thrust. The 360 degree closing transitioning ball valve, 35 jet combustion chamber, 37 delivers compressed oxygen rich high speed air to transitioning liquid oxygen fuel mixture elements, 43 and 44 as the ball valve, 35 closes the top of the lower rocket engine combustion chamber, 36. The ball valve jet engine exhaust chamber 35 airlocks the turbojet engine components, 34 from the lower rocket combustion chamber, 36 during long rocket engine burns or when in hazardous or vacuum environments. The ball valve jet exhaust chamber, 35 is in open position during turbojet element, 34 use. The ball valve chamber 35 is in closed position during lower rocket engine chamber, 36 uses. The vertical engine(s) 20 location within the aerodynamic platform space craft embodiment, 10 is not limited to any single orientation or location. Engines, 20 can be constructed of conventional turbo jet and rocket engine elements. Forty four small chemical burst, standard maneuvering thrusters are positioned similar to industry standard systems. The preferred embodiment consists of two vertical inline hybrid turbojet-rocket engines, 20 with components similar to the engine 18 referenced in figure FIGS. 6 and 7, having interchangeable engine components for deep space missions. The two vertical engines 20 in FIG. 7 however, contain no scramjet components. Engine air intake, and exhaust are protected preferably by triangular envelope doors, 19*a* tapered to match the aerodynamic embodiment, 10. The thrust from the preferred engines 18 and 20 are adequate for the aerodynamic platform spacecraft, 10 to achieve forward, vertical lift and decent in atmospheric conditions.

Figure 11:
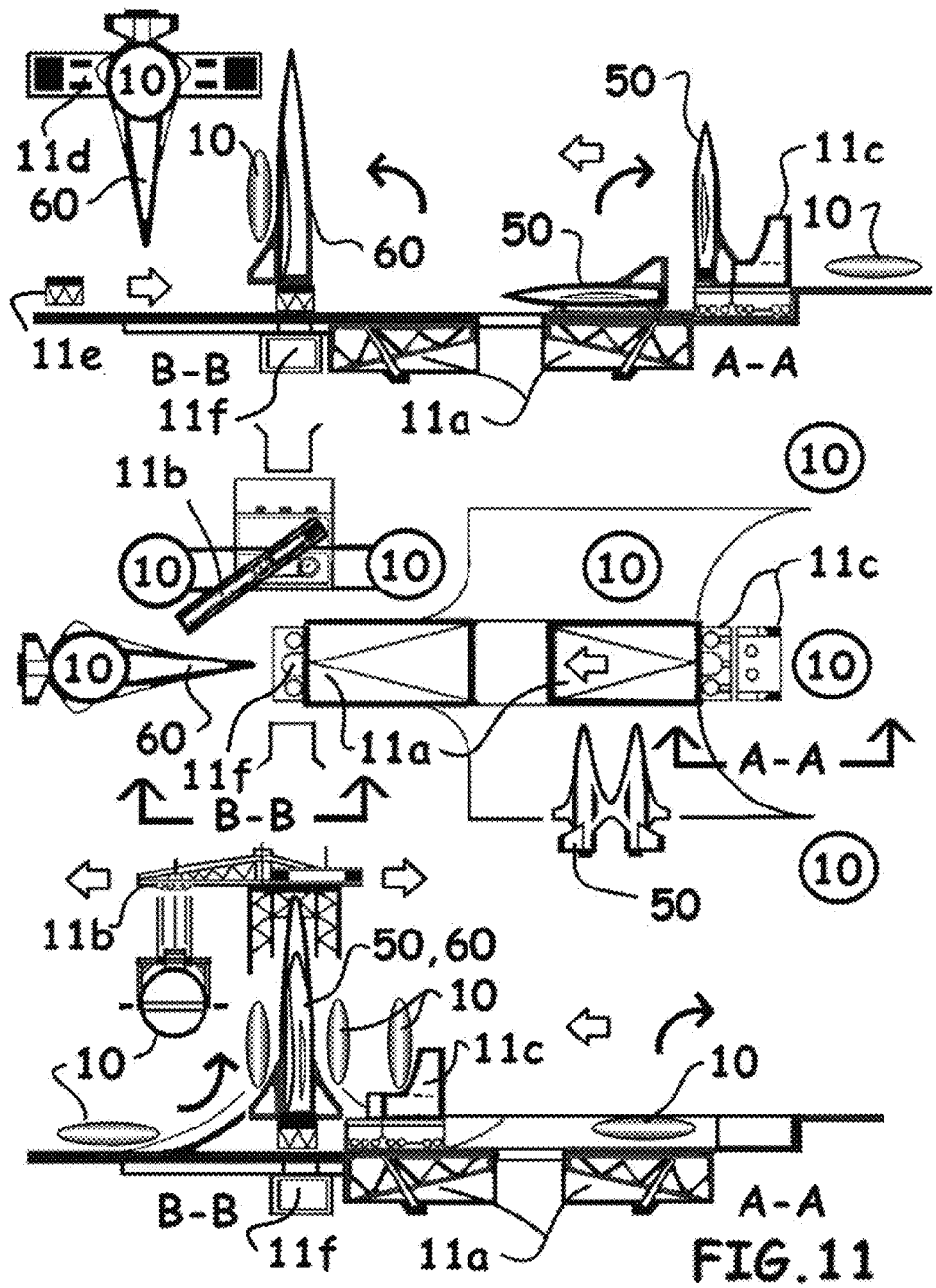
FIG. 11 is a launch port, airport, spaceport site plan, mobile launch pad, service tower cross section configuration and general logistics embodiment serving the booster assembly in FIG. 10.
Figure 12:
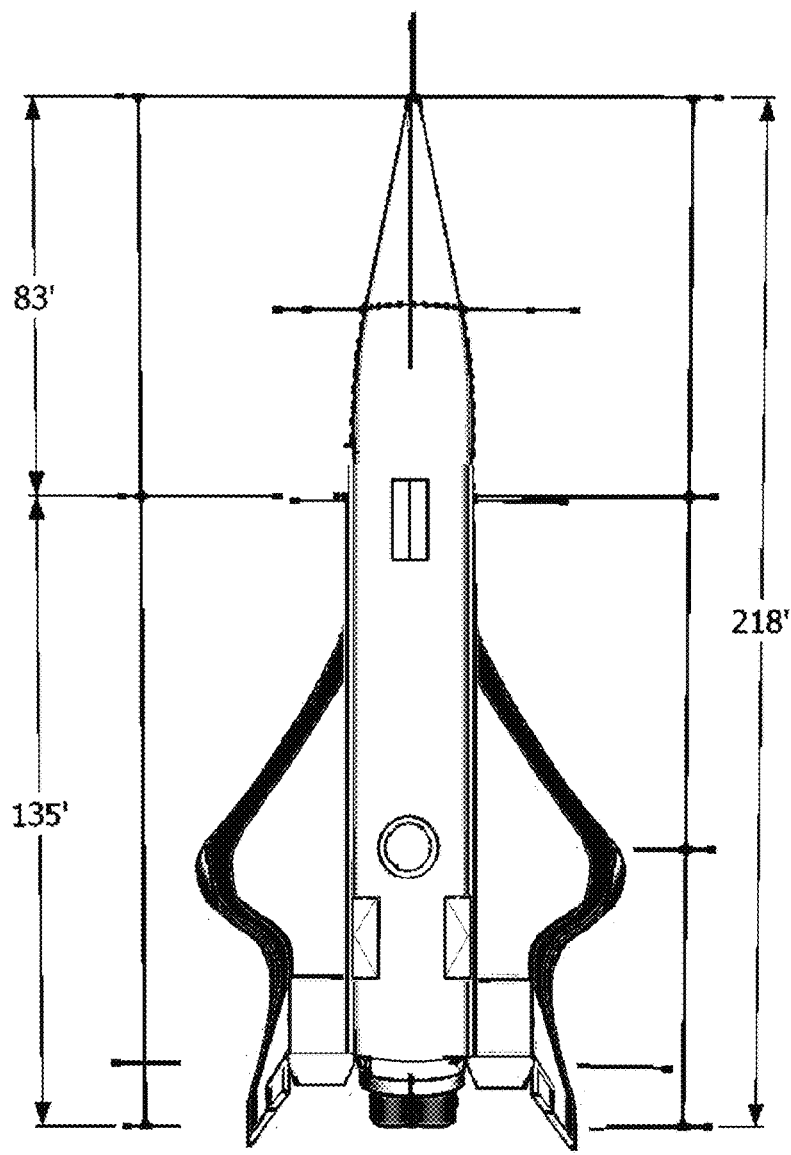
FIG. 12 is a bottom view showing the central booster drone embodiment of the invention.
Figure 13:
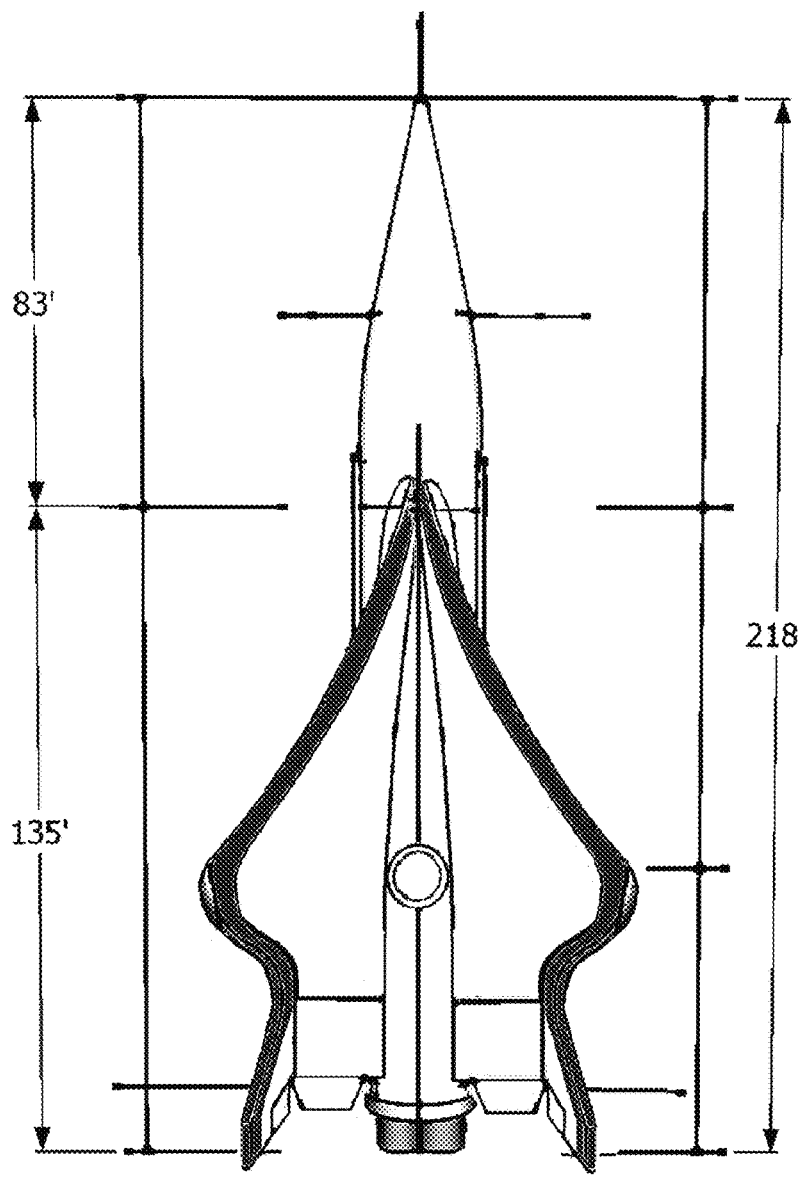
FIG. 13 is a top view showing the central booster drone embodiment of the invention.
Figure 14:
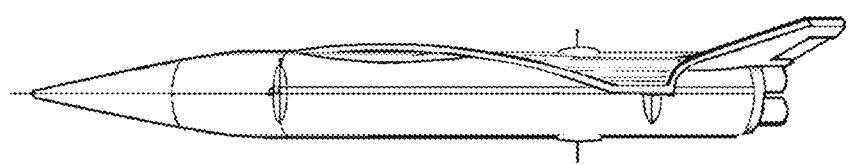
FIG. 14 is a side view showing the central booster drone embodiment of the invention when in horizontal return flight or landed service position.
Figure 15:
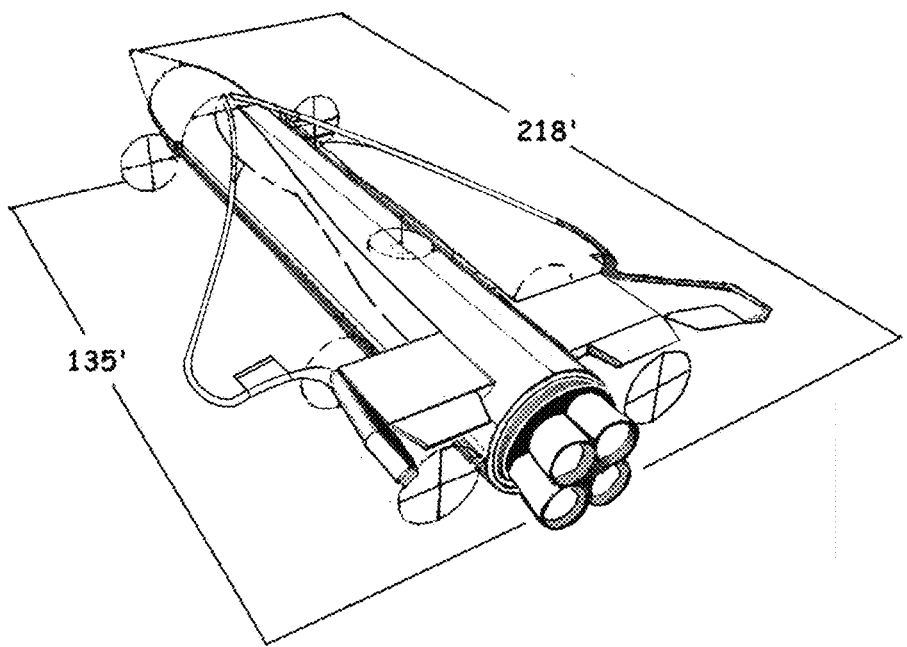
FIG. 15 is a rear aft portside top perspective view showing another central booster drone embodiment of the invention, showing but not limited to four engine clusters when in horizontal return flight or landed service position.
Figure 16:
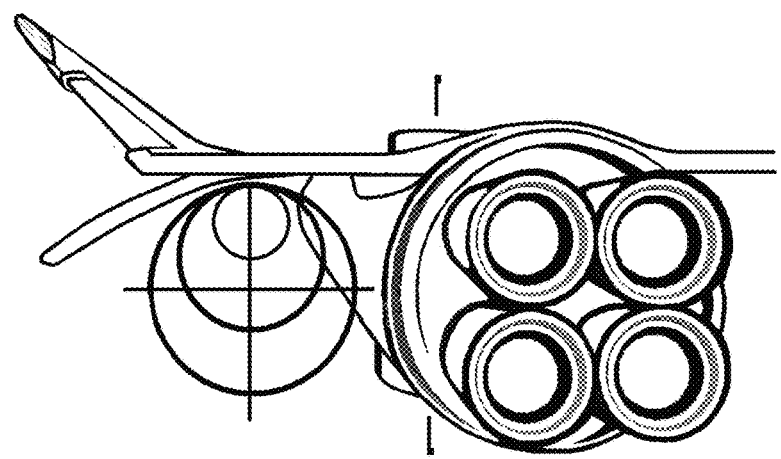
FIG. 16 is a rear aft portside top perspective view showing another central booster drone embodiment of the invention, showing but not limited to four engine clusters when in horizontal return flight or landed service position.
Figure 17:
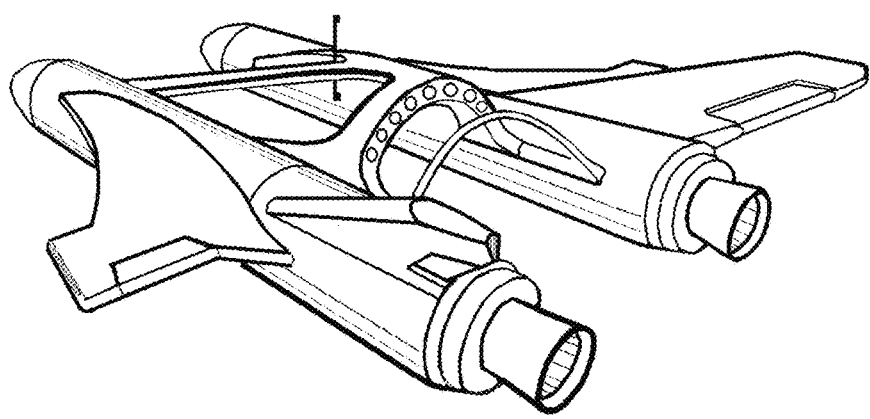
FIG. 17 is a rear aft portside top perspective view showing the stage 1 attached twin booster drone embodiment of the invention when in horizontal return flight or landed service position.
Figure 18:
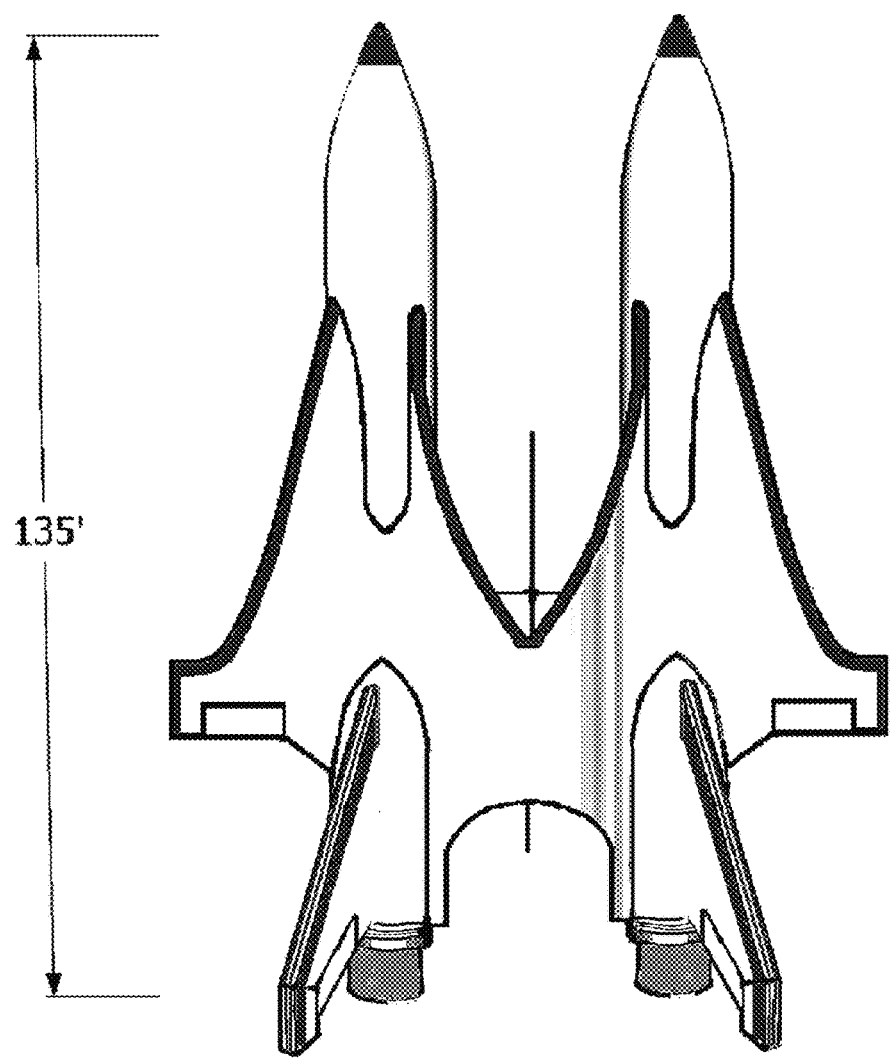
FIG. 18 is a top view showing the stage 1 attached twin booster drone embodiment of the invention when in horizontal return flight or service landed position.
Figure 19:
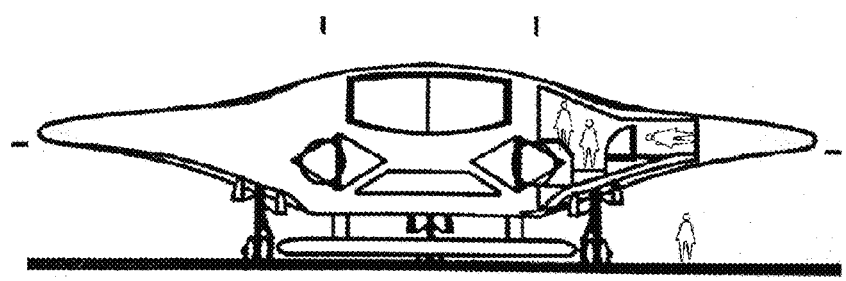
FIG. 19 is a rear aft view showing one embodiment of the aerodynamic platform spacecraft in FIGS. 1, 2, 3, 4.
Figure 20:
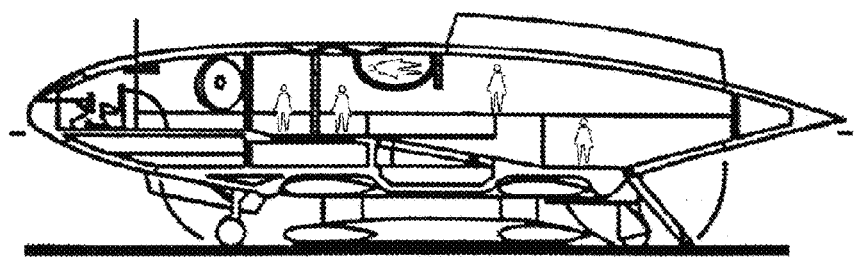
FIG. 20 is a cross section showing one embodiment of the cargo bay within the aerodynamic platform spacecraft in FIGS. 1, 2, 3, 4.
Figure 21:
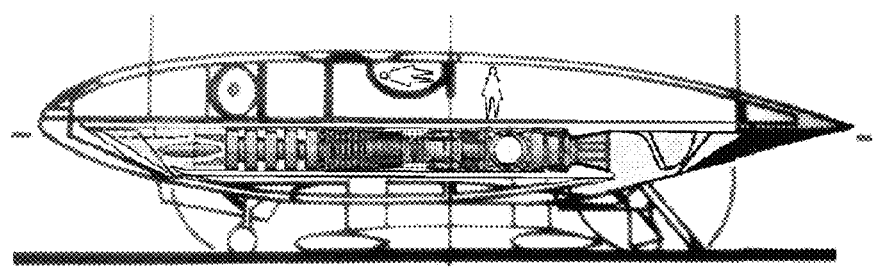
FIG. 21 is a cross section showing one embodiment of one of two parallel adjustable rear thrust engines within the aerodynamic platform spacecraft in FIGS. 1, 2, 3, 4.
Figure 22:
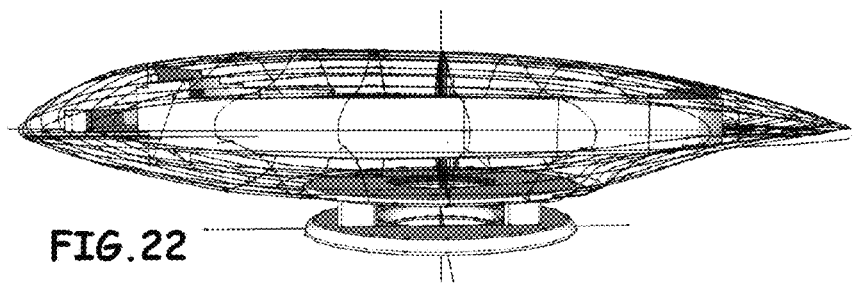
FIG. 22 is a portside view showing the massing embodiment and exterior, multi-plane, multi-curve, profile surfaces of the aerodynamic platform space craft in FIGS. 1, 2, 3, 4.
Figure 23:
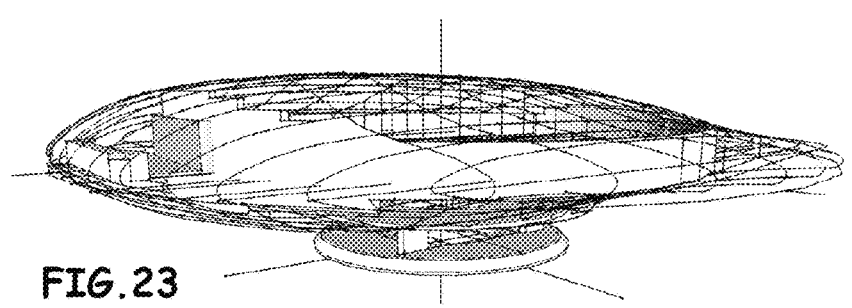
FIG. 23 is a front portside view showing the massing embodiment and exterior, multi-plane, multi-curve, profile surfaces of the aerodynamic platform space craft in FIGS. 1, 2, 3, 4.
Figure 24:
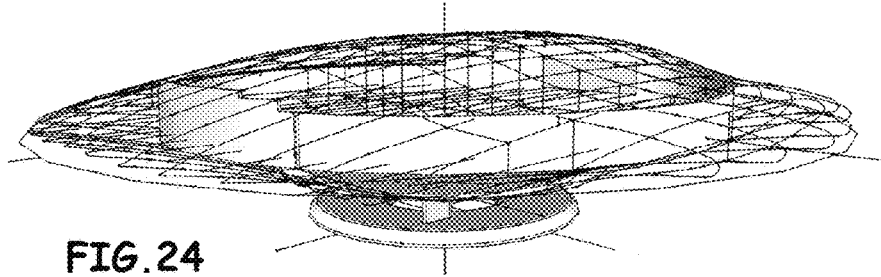
FIG. 24 is a rear starboard view showing the massing embodiment and exterior, multi-plane, multi-curve, profile surfaces of the aerodynamic platform space craft in FIGS. 1, 2, 3, 4.
Figure 25:
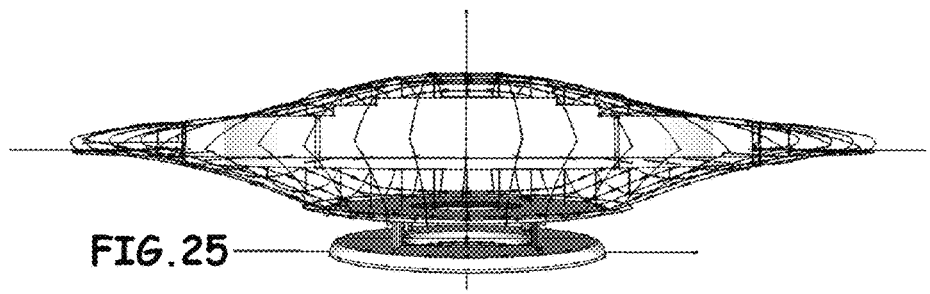
FIG. 25 is a rear view showing the massing embodiment and exterior, multi-plane, multi-curve, profile surfaces of the aerodynamic platform space craft in FIGS. 1, 2, 3, 4.
Figure 26:
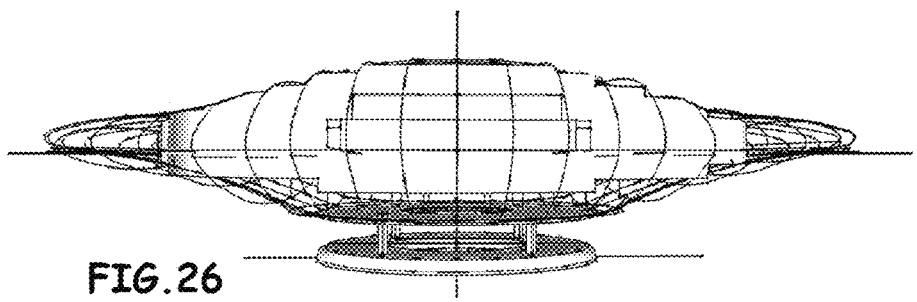
FIG. 26 is a front view showing the massing embodiment and exterior, multi-plane, multi-curve, surfaces of the aerodynamic platform space craft in FIGS. 1, 2, 3, 4.
Figure 27:
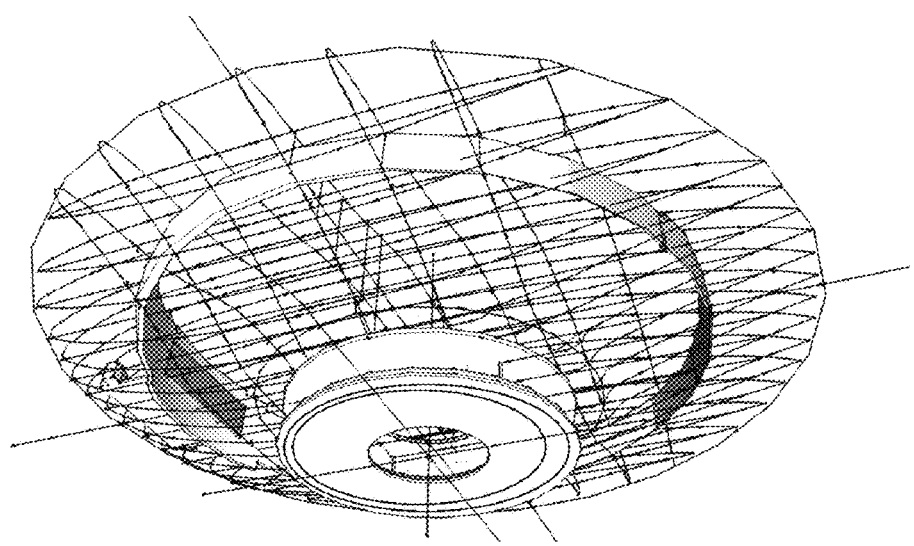
FIG. 27 is a rear portside bottom view showing the massing embodiment and exterior, multi-plane, multi-curve, bottom compression lift enhancing front to back ribbed surfaces of the aerodynamic platform space craft in FIGS. 1, 2, 3, 4.
Figure 28:
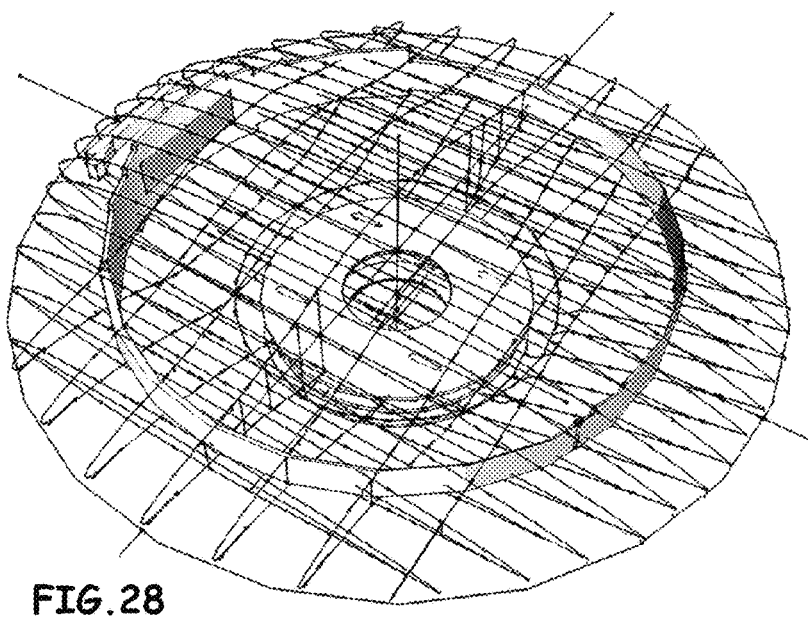
FIG. 28 is a top rear portside view showing the massing embodiment and exterior, multi-plane, multi-curve, profile surfaces of the aerodynamic platform space craft in FIGS. 1, 2, 3, 4.

Referring now to the invention shown in FIG. 11. In this illustration the aerodynamic space craft, 10 is shown in ground level plan and in upright launch position attached to booster, 60. Two aerodynamic space craft, 10 can be attached on opposite sides of the booster, 60. The double drawbridge, 11*a* function is to rotate 90 degrees the stage 1 booster, 50 and the stage 2 booster, 60 into up right positions attached to the double drawbridge, 11*a* release able connections, into a vertical position over the launch pad 11*e*, over the blast tunnel, 11*f*. The double drawbridge, 11*a* is then lowered. The service tower crane 11*b* positions the aerodynamic space craft, 10 during prelaunch assemble to booster, 60. The first of two rolling platforms, 11*e* move the up righted stage 1 twin booster, 50 to the launch position pad 11*e*, over the blast tunnel, 11*f* wherein the stage 1 twin booster 50 is attached to the stage 2 booster 60 with release able connections stage 1 separation bogie assembly, 54 and 55, above the stage 1 twin booster stabilizer brace, 56 aligned to the release able connections of the stage 2 separation slip track system, 53 attached to the stage 2 booster, 60. The horizontal truss crane, 11*d* can load from above the aerodynamic space craft, 10 within taxi accessible aircraft scale hangers or lift the aerodynamic space craft, 10, during prelaunch, placing it horizontally on top of the booster, 60 before up righting the aerodynamic space craft, 10 attached to the booster, 60. The second of two rolling platforms, 11*c* move a primary or second up righted aerodynamic space craft, 10 to the launch position pad, 11*e* where it is then attached to the booster 60. Such prelaunch logistics allow all aerodynamic space craft, 10, 50 and 60 to be landed, serviced, and loaded at grade level or in aircraft hangers. The vertical heavy lift system allows the aerodynamic spacecraft, 10 to be launched on boosters 50 an 60 simultaneously resulting in double payload launches. The aerodynamic space craft, 10 with propulsion engines effectively carry their own weight at liftoff. The vertical launch, booster assist system illustrated enables a faster escape velocity trajectory to obit before heavy lift rocket engine fuel is depleted.

Figure 30:
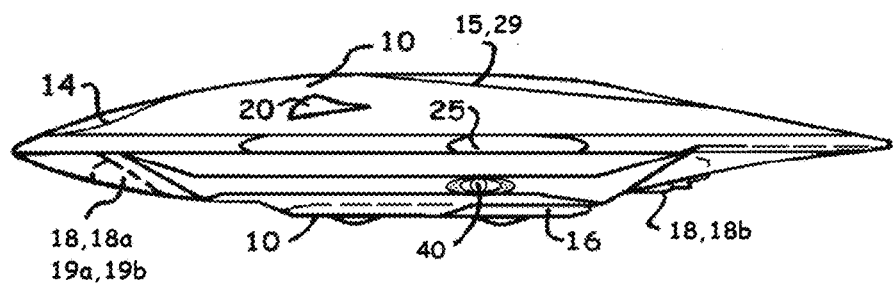
FIG. 30 is a portside alternate four engine embodiment cross section view of the invention showing one of two parallel internal hybrid turbojet-scramjet-rocket engines over one of two supersonic air bleeding, shockwave reducing, tapered wall, air bypass, conventional scramjet chambers with shared air intake and engine exhaust of FIG. 31.
Figure 31:
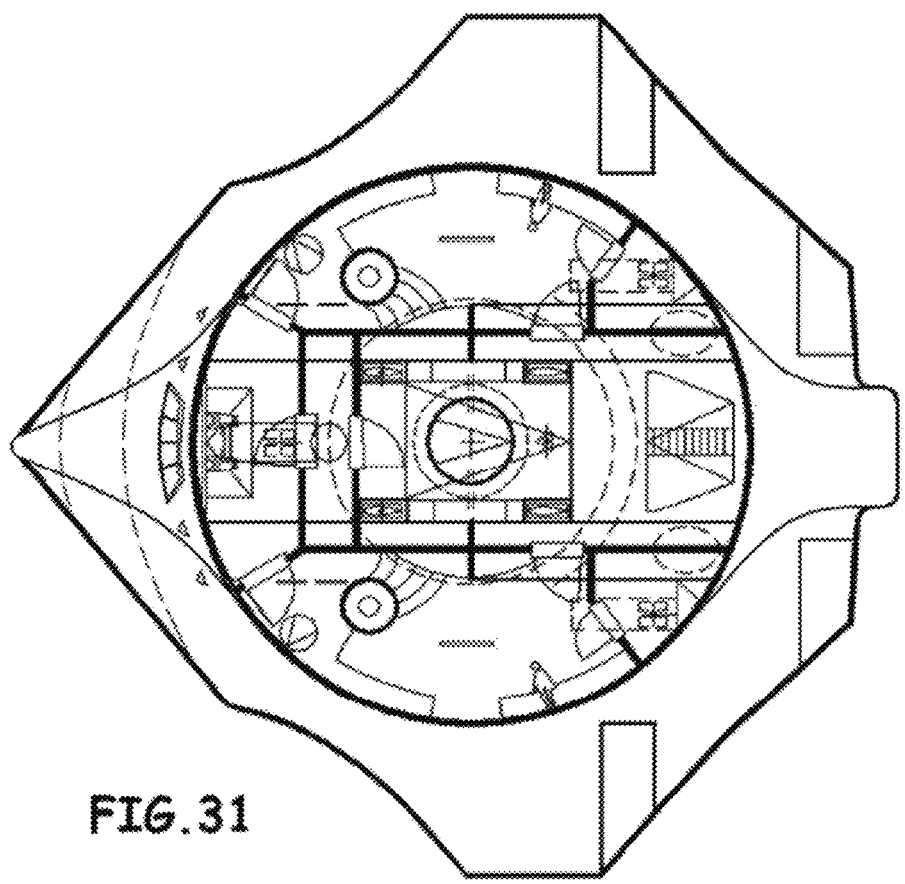
FIG. 31 is a top view showing one alternate wide body plan C showing another center of gravity based aerodynamic embodiment capable of compression lift at hypersonic speeds, illustrating interior flexibility of the flight deck, support area floor plan, engine locations, cargo bay and the 1G corridor the invention.

Referring now to the invention shown in FIG. 30. In this illustration the aerodynamic space craft, 10 is shown in a side view and plan view in FIG. 31. Referring now to the invention in more detail, in FIG. 30 there is shown an aerodynamic platform spacecraft, 10 The upper cargo bay doors, 29, front pilot cabin, 14 and upper vertical engine, 20 locations are illustrated. The location of the leading edge, 25 of the winged embodiment of FIG. 31 are illustrated. The lower front region of the lifting body is tapered to receive the recessed ring wing or similar under carriage wing, 16 and internal to the lifting body two parallel engines, 18. The turbo-scramjet hollow core conduit, 40 is shown in side view and cross section. The front engine air intake, 18*a*, engine protection door, 19*a*, engine protection door recess, 19*b* and downward pivoting rear engine, 18*b* locations are illustrated.

Figure 32:
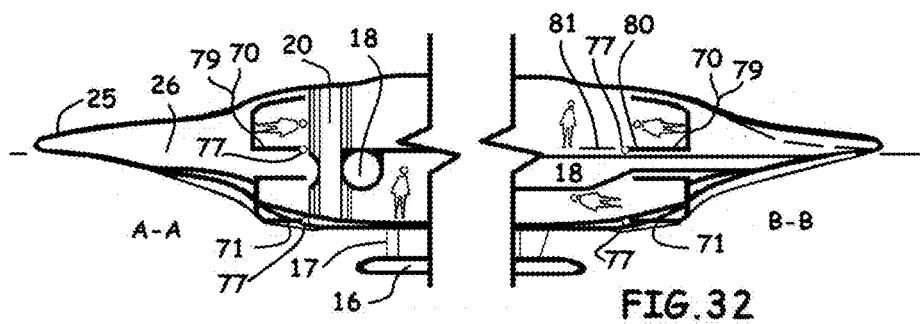
FIG. 32 is a cross section showing one embodiment front starboard quarter A-A view and rear portside quarter B-B view illustrating two freely rotating centripetal rotating gravity corridors within one wide body plan D.
Figure 33:
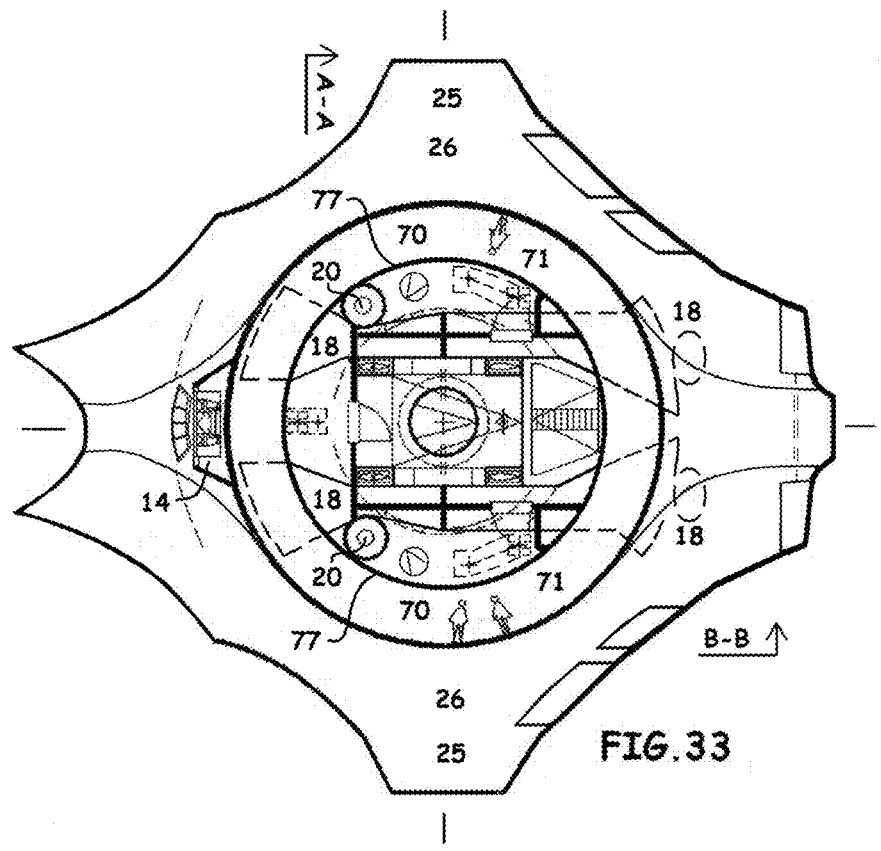
FIG. 33 is a top view showing plan D, another alternative center of gravity based aerodynamic embodiment illustrating two internal rotating unfixed centripetal rotating gravity corridors(s), area(s) or level(s) identical in plan showing each level with central relatively fixed internal storage and linear engine core access areas within an embodiment capable of flight and reentry.

Referring now to the invention shown in FIG. 32, cross section and FIG. 33 top view. The alternate D embodiment illustrates another centripetal aerodynamic platform spacecraft having two rotating unfixed centripetal rotating gravity corridors(s), area(s) or level(s), 70 and 71, identical in plan, free to rotate in zero gravity environments independently or in opposite directions producing centrifugal rotating gravity when traveling around relatively fixed zones, and other embodiment elements. As illustrated other relatively fixed elements include but are not limited to the following: Pilot's area, 14, Ring wing, 16. Ring wing vertical stabilizer support, 17. Horizontal engine, 18. Front vertical engines, 20. Outer body wing edge, 25. Fuel storage tanks, 26.

Figure 34:
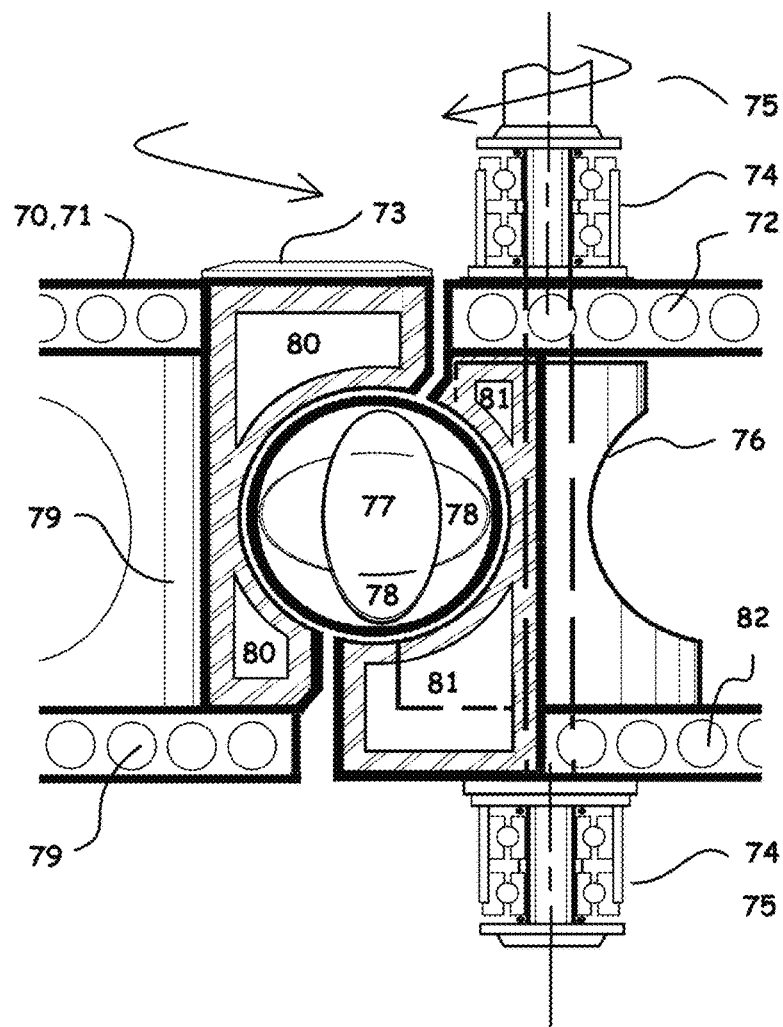
FIG. 34 is a cross section showing one embodiment of the silent, zero G, rotating gravity floor/wall assembly, bearing track, adjacent to fixed floor areas. Fixed light weight metal, composite or polymer floor edge track brackets align with rotating light weight bearing metal, composite or polymer floor/wall edge track brackets, in FIGS. 32 and 33.

Referring now to the invention shown in FIG. 34. In this cross section, silent in zero gravity, rotating perimeter upper floor-wall assembly, 70 and lower level floor-wall assembly, 71 alignments and bearing tracks 80, 81 are illustrated. The rotating gravity floor-wall framing assembly, 79 is illustrated. Rotating light weight metal, composite or polymer floor/wall edge track brackets, 80 align with relatively fixed light weight metal, composite or polymer floor edge track brackets, 81. Attached to fixed floor assembly 72 and 82 are flanked preferably by but not limited to rotating magnetic repelling surface, hour glass shaped, roller pin guide alignment brackets, 76. Ball bearing, and or dry lubricant, polymer slip surface assembly in shaft bearing housing, 74 reduce friction and assist in braking or accelerations of the free spinning magnetic repelling floor-wall edge bearing bracket, 80. The continuous and curved threshold ribbed rotation motor track, 73. Generator, braking and or acceleration power shaft, 75 is illustrated. Tracks 80 and 81 are configured to transfer rotational, centripetal and gravitational loads through light weight composite or metal polymer coated ball bearings, 77, six inches in diameter, but not limited to this dimension. The number and size of ball bearings, 77 and the dry lubricant polymer spacer, 78 lengths, preferably but not limited to twelve inches between ball bearings, can be adjusted for centripetal and floor/wall assembly loads. Tracks 80, 81 and ball bearings, 77 are aligned to resist separation in zero gravity environments and support floor loads in natural gravity environments. Rotating, roller pin guide alignment brackets, 76, spinning and rotating ball bearings, 77 and dry lubricant polymer spacer, 78 align and facilitate the rotation of habitable zones separated by the curved complimentary tracks 80 and 81. All bearing surfaces, rotating, roller pin guide alignment brackets, 76, or ball bearing, 77 are within a tolerances of but not limited to 0.16 to 0.21 dynamic friction clearances and utilize zero gravity tolerances to allow the unfixed centripetal gravity corridors(s), area(s) or level(s), 70 and 71 freedom to rotate and provide exponential propulsion assist within a relatively fixed aerodynamic embodiment capable of flight and reentry.

This patent includes internal unfixed centripetal rotating gravity corridors(s), area(s) or level(s), 70 and 71 one above and or one below around relatively fixed internal storage and linear accessible engine cores, 18 within a preferable but not limited to a 17 to 23 foot, top to bottom embodiment thickness, 90 to 102 foot in diameter and gravity corridors, 70 and 71 at a 33 foot radius(s) all within an embodiment, 10 capable of flight and natural gravity reentry.

Figure 36A:
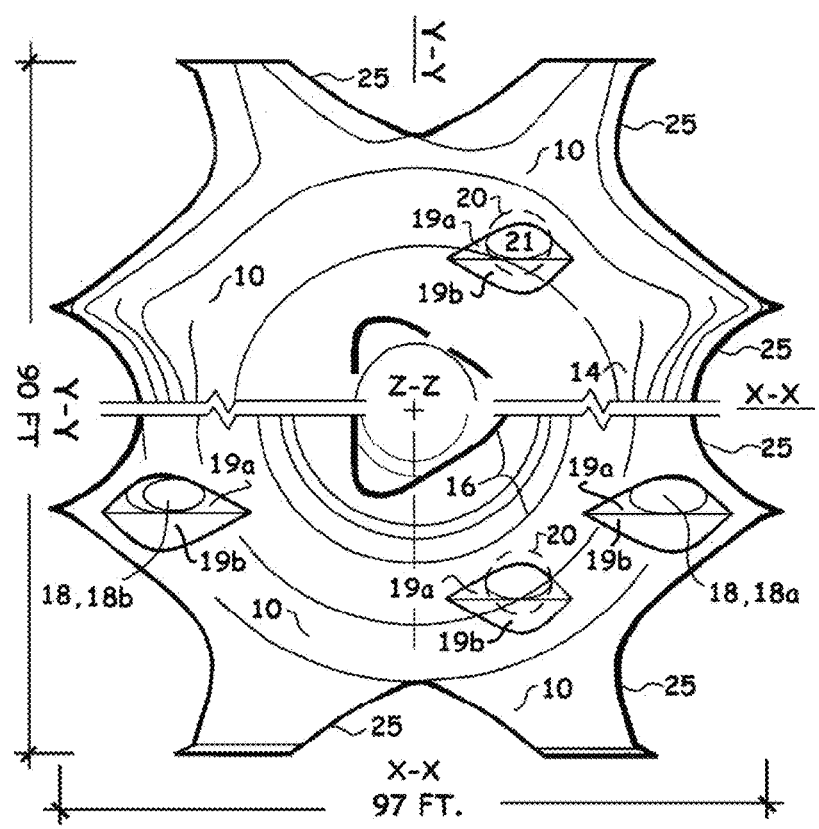
FIG. 36a One half top and one half bottom view of the embodiment.

Referring now to the invention shown in FIG. 36*a*. In this plan view, one top half and one bottom half view of the embodiment are illustrated. In this embodiment the saucer shape mass is reduced to decrease aerodynamic platform, 10 volume, weight, improve hypersonic aerodynamics and align lifting surfaces symmetrically to maintain balanced centers of mass internally when the craft is in full body rotation and producing rotational gravity within its interior circumference boundaries. The leading wing edges, 25 provide increased yet thinner lifting surface and control surface areas. Horizontal engines, 18 are internal. Horizontal engine front combustion air intakes, 18*a* are covered during atmospheric reentry by, 19*a* engine protection doors. When open and allowing combustion air to the internally cased hybrid thrust propulsion engines, 18 and 20 the engine protection doors, 19*a* pivot and are secured within engine protection doors body recess 19*b*. The vertical engine, 20 downward propulsion thrust, vertical engine air intake, 21 is illustrated in the upper half of the plan. The lower half of the plan illustrates the underside of the aerodynamic platform, 10. The lower body vertical thrust propulsion engine, 20 location is illustrated. The horizontal engine rear adjustable exhaust, 18*b* is illustrated.

Figure 36B:
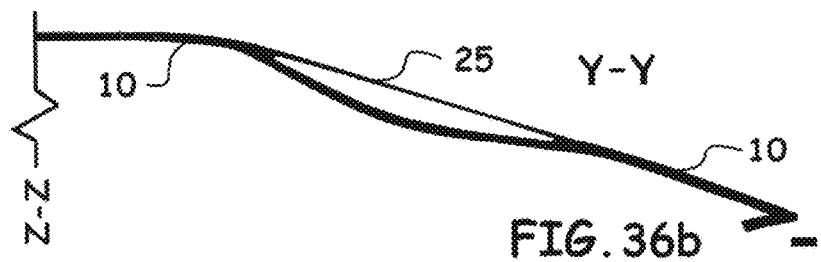
FIG. 36b Wing side section profile of the embodiment.

Referring now to the invention shown in FIG. 36*b*. In this section view, one top half rear view of the aerodynamic spacecraft body, 10, the wing profile of the embodiment along the y-y axis is illustrated. The thicker lifting surface leading edge, 25 beyond the upper wing profile is illustrated.

Figure 36C:
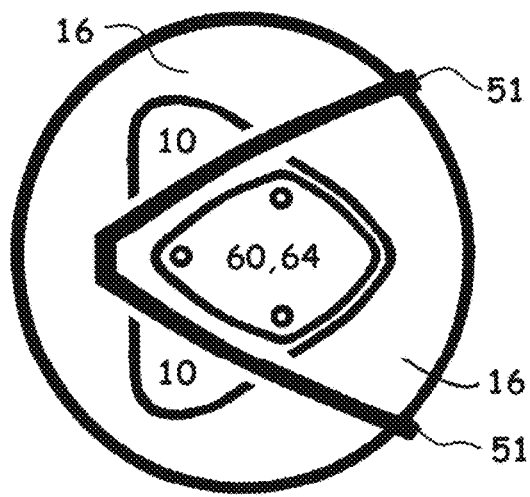
FIG. 36c Connection plan of ring wing when attached to stages one and two boosters or another shuttle in zero gravity environments.
Figure 36D:
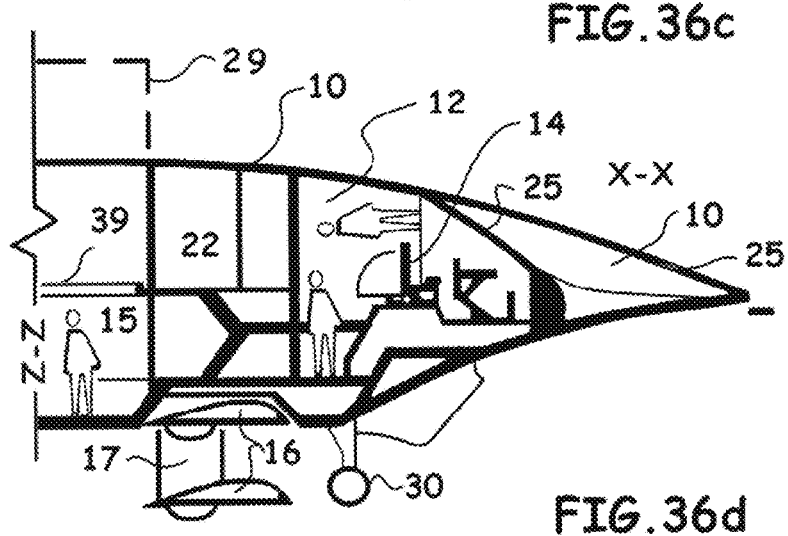
FIG. 36d Fabrication profile of embodiment shell at pilot's front area.
Figure 36E:
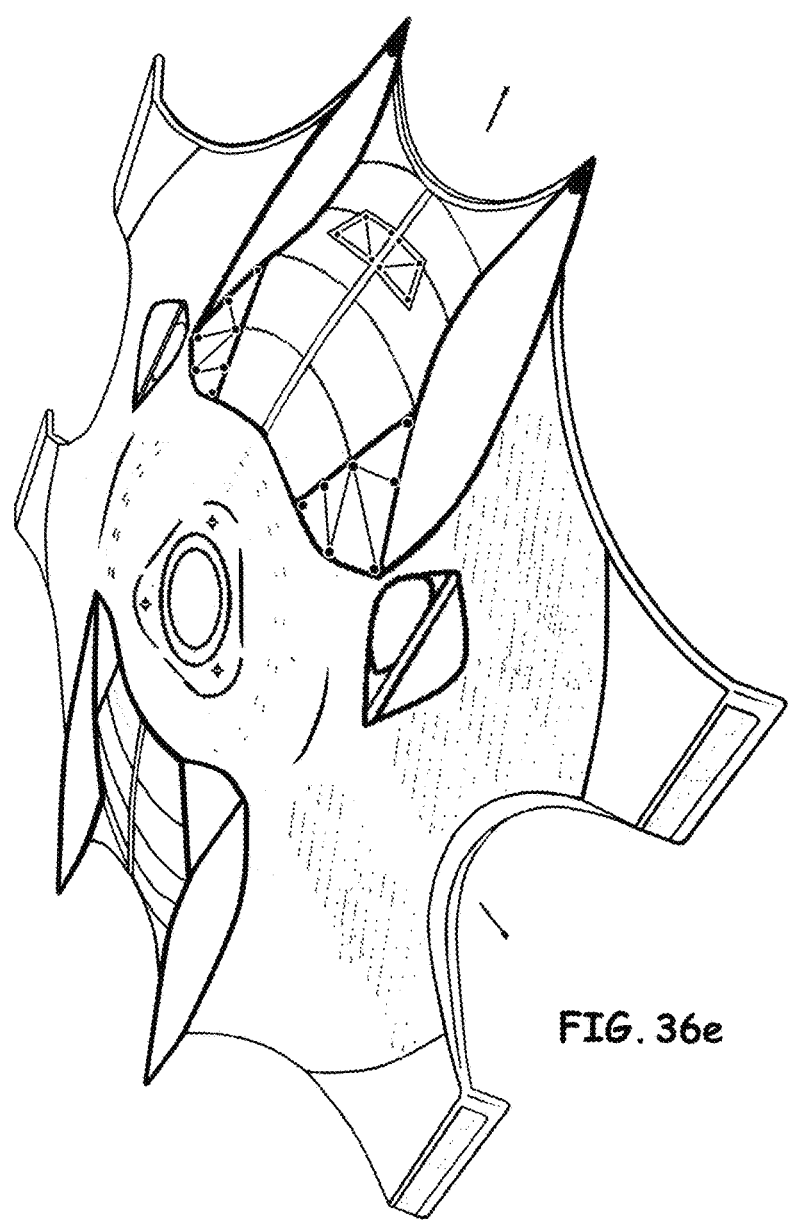
Figure 36F:
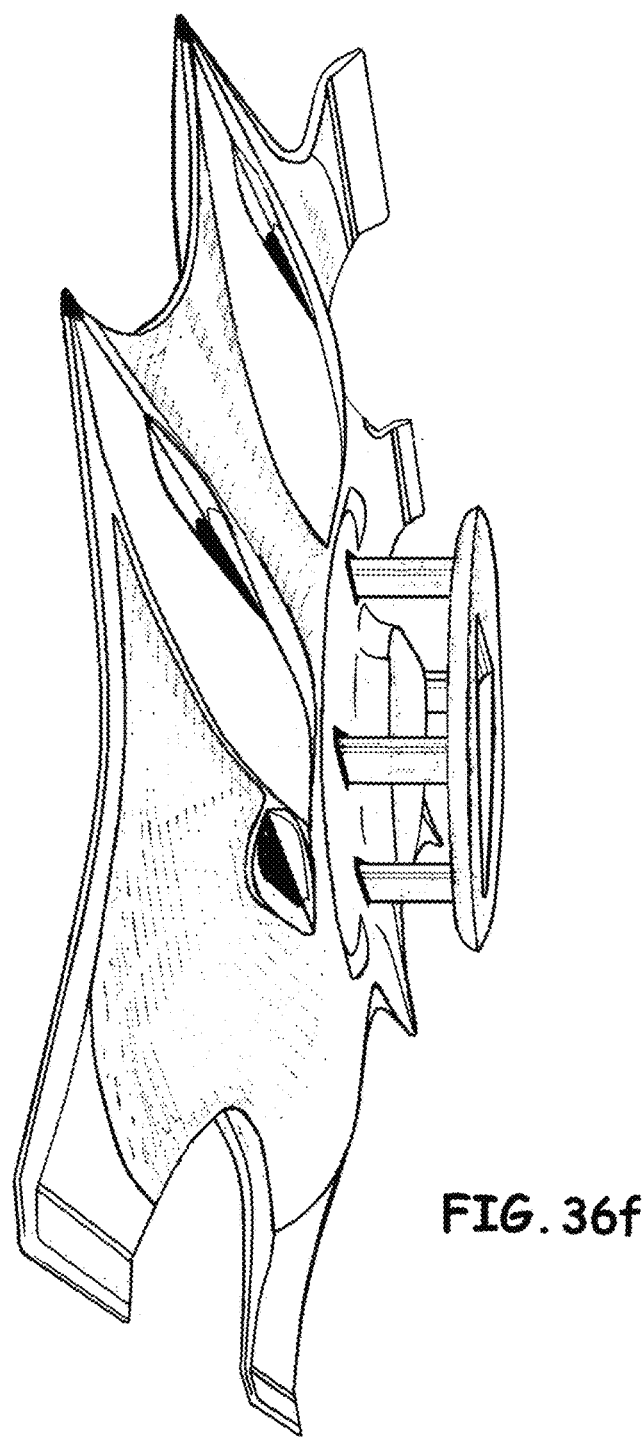

Referring now to the invention shown in FIG. 36*c*. In this plan view the flat mate release able connection area, 64 on the stage two booster, 60 is illustrated. The open center of the, ring wing, 16 surrounds this area when the aerodynamic platform spacecraft, 10 is mated at prelaunch to the stage 2 booster, 60. The flat mate release able connection area, 64 of the aerodynamic spacecraft body, 10 matches one of the two, opposite side, flat mate release able connection area, 64 of the stage two booster, 60. The common curved wing, 51 of the stage 1 twin boosters, 50 saddle, slip clear and exit the connection area, 64 during stage 1 booster, 50 separation allowing two shuttles, 10 to remain attached to the stage 2 booster, 60 and Referring now to the invention shown in FIG. 36*d*. In this section view the fabrication profile of aerodynamic platform spacecraft, 10 embodiment shell at pilot's front area, 14 is illustrated. The lifting body leading edge, 25 is tapered to reduce drag, and thickened at the leading edge center to dissipate reentry heat. The location of the cargo bay, 15; cargo bay upper door, 29; adjustable ramped floor, 39; airlock, 22; centripetal gravity corridor, 12; are illustrated. The retractable wheeled landing gear, 30 and the retractable ring wing, 16 are shown in section and the integral ring wing vertical stabilizer strut, 17 locations illustrated.

Figure 37J:
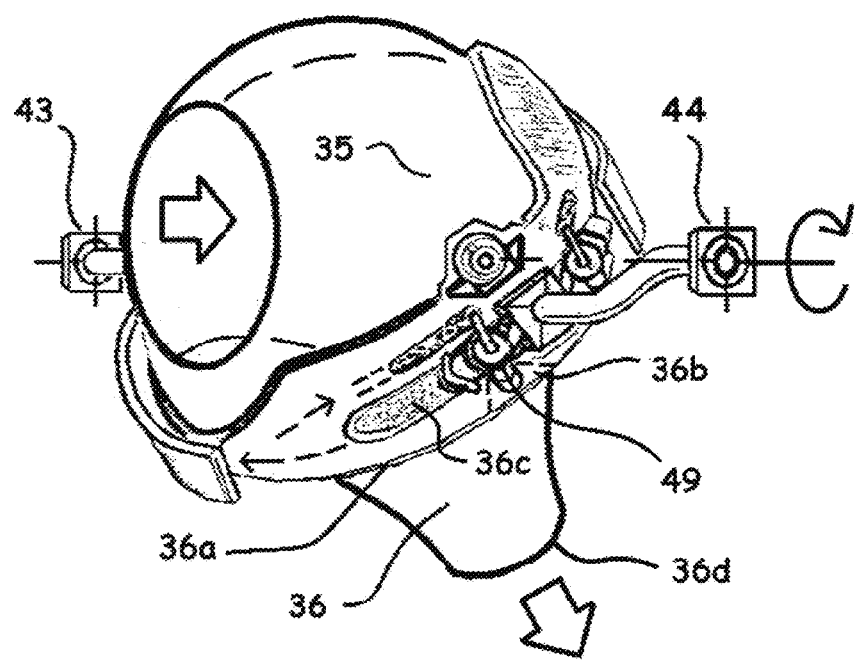
FIG. 37j, is an engine component side view of the ball valve and adjustable rocket exhaust nozzle. The ball valve is open and can channel turbo-scramjet exhaust through the hollow core exhaust nozzle. The pivoting exhaust nozzle comprises an inner rocket combustion chamber capable of channeling in line turbo-scramjet propulsion thrust and an outer nozzle surface comprising, annular, aerospike rocket engine propulsion thrust cells.
Figure 38:
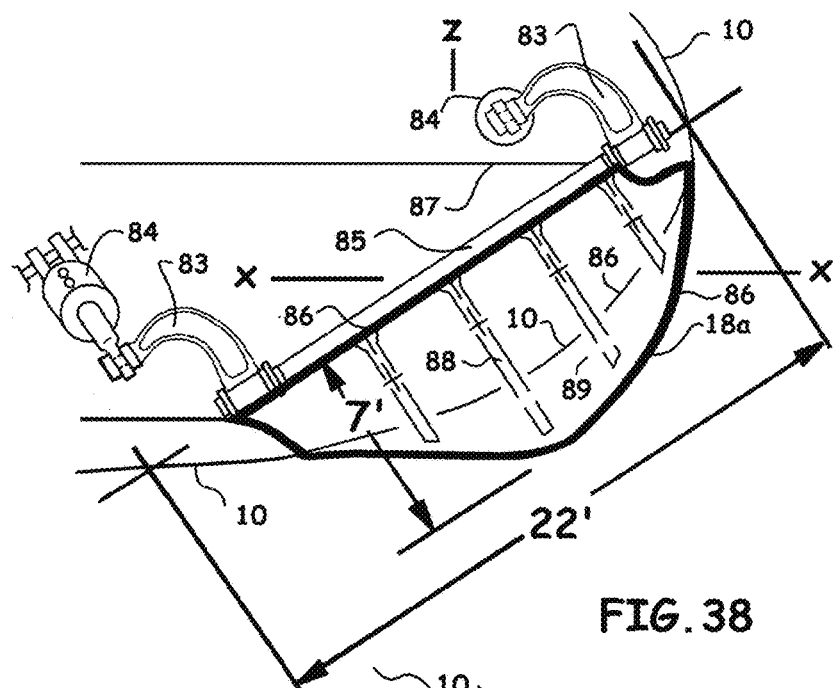
FIG. 38 is a front starboard side view of a closing engine protection door.
Figure 39:
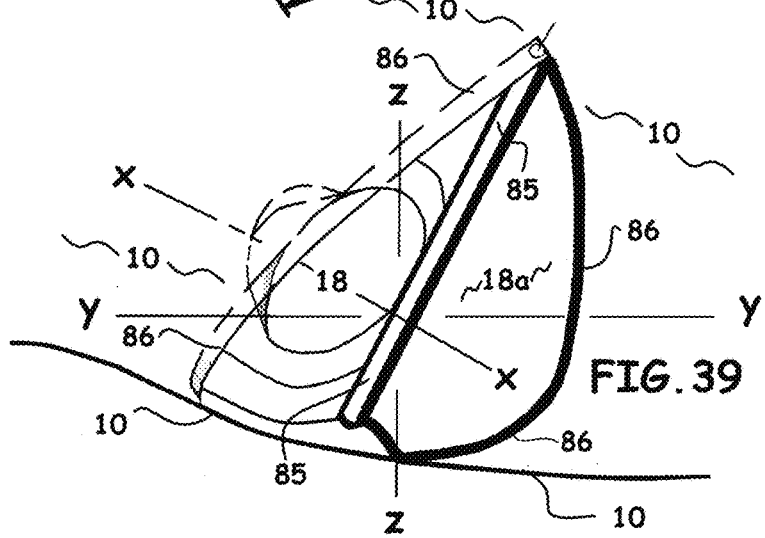
FIG. 39 is a front starboard side view of a fully open engine protection door.
Figure 40:
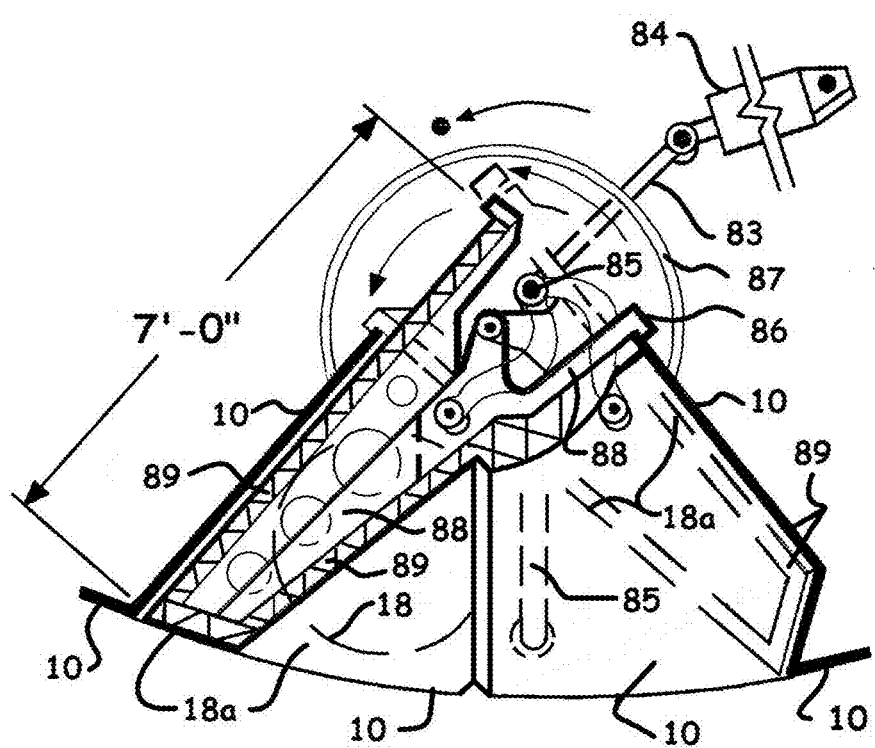
FIG. 40 is a front starboard section of a fully closed engine protection door.

Referring now to the invention shown in FIG. 37*j*. A side view of the 360 degree rotation air regulator ball valve, 35 and 90 degree rotation rocket engine nozzle, 36 are illustrated. The ball value is in open position. The ball valve, 35 in open position, channels air to the pivoting rocket engine nozzle, 36 through the ball valve, 35 curved inner wall channel. The primary oxidizer value, 43 is aligned with the pivot axis of the ball valve, 35 and rocket engine nozzle, 36. The primary fuel valve, 44 is aligned with the pivot axis of the ball valve, 35 and rocket engine nozzle, 36. This pivot axis alignment reduces the number of pivot actuators required to rotate the rocket engine nozzle, 36, 90 degrees. The hollow core rocket engine nozzle, 36 channels turbojet, afterburner, scramjet and interior rocket engine thrust cells, 36*c* propulsion exhaust through the open nozzle base, 36*d*. The ball valve, 35 can rotate to close off the top of the rocket engine combustion chamber, 36*c*. The inner rocket engine combustion chamber, annular manifold 1 comprises annular interior thrust cells, 36*c* within the rocket engine combustion chamber nozzle, 36. The annular manifold 2 exterior aerospike perimeter thrust cells, 36*a* around the exhaust nozzle exterior has but not limited to, two pre-burn, hot gas, turbo igniter pump, exhaust ports, 36*b*, flanking the pivot axis. The two exhaust ports, 36*b* are below the rocket fuel line, 44 two turbo pumps, 49. Two adjacent pre-burn, hot gas, turbo igniter pump, exhaust ports, 36*b*, are located on the opposite side of the ball valve, 35 pivot axis. The two, opposite side, exhaust ports, 36*b* are below the oxidizer line, 43 two turbo pumps, 49; and Referring now to the invention shown in FIGS. 38, 39 and 40. In cross section, the engine front protection door, 19*a* is at right angles to the ground plain illustrating the door dimensions and the axle actuator, 85 with internal hinged stiffing ribs, 88 within the door panel, 19*a*. The door, 19*a* in open or closed position uniquely maintains a stealth profile while also maintaining standard pressurized latch edge seals, 86 in open or closed positions. Doors, 19*a* utilize a double skin honey cone heat dissipating composite skin, 89 on both sides. Aerospace industry standard roller latch and actuated open-close latch hooks along the pressurized edge seal, 86 can be of aerospace industry configurations. Pneumatic, electromagnetic, actuators, 84 are utilized to power rotate lever arms, 83 attached to the door axle, 85. Lever arms, 83 at the end of the door axle, 85 and beyond the door bay pressure seal wall, 87 enclosure also allows failsafe manual opening and closing of the doors.

Figure 10:
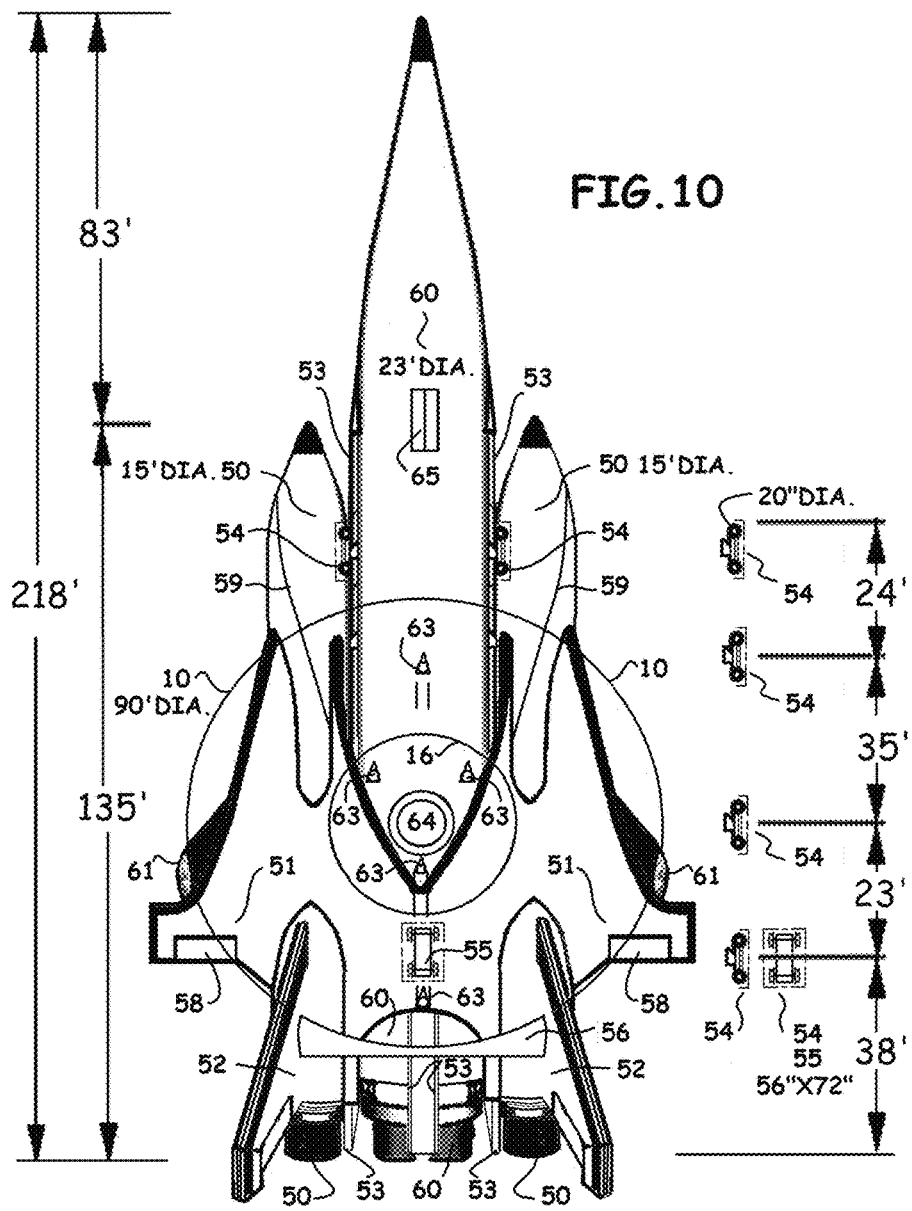
FIG. 10 is a side view of the booster launch assembly in upright prelaunch position supporting one or two saddled centripetal aerodynamic platform space craft of the invention in FIGS. 1, 2, 3, 4, 5, 31, 33, and 36.
Figures 10A, 10B:
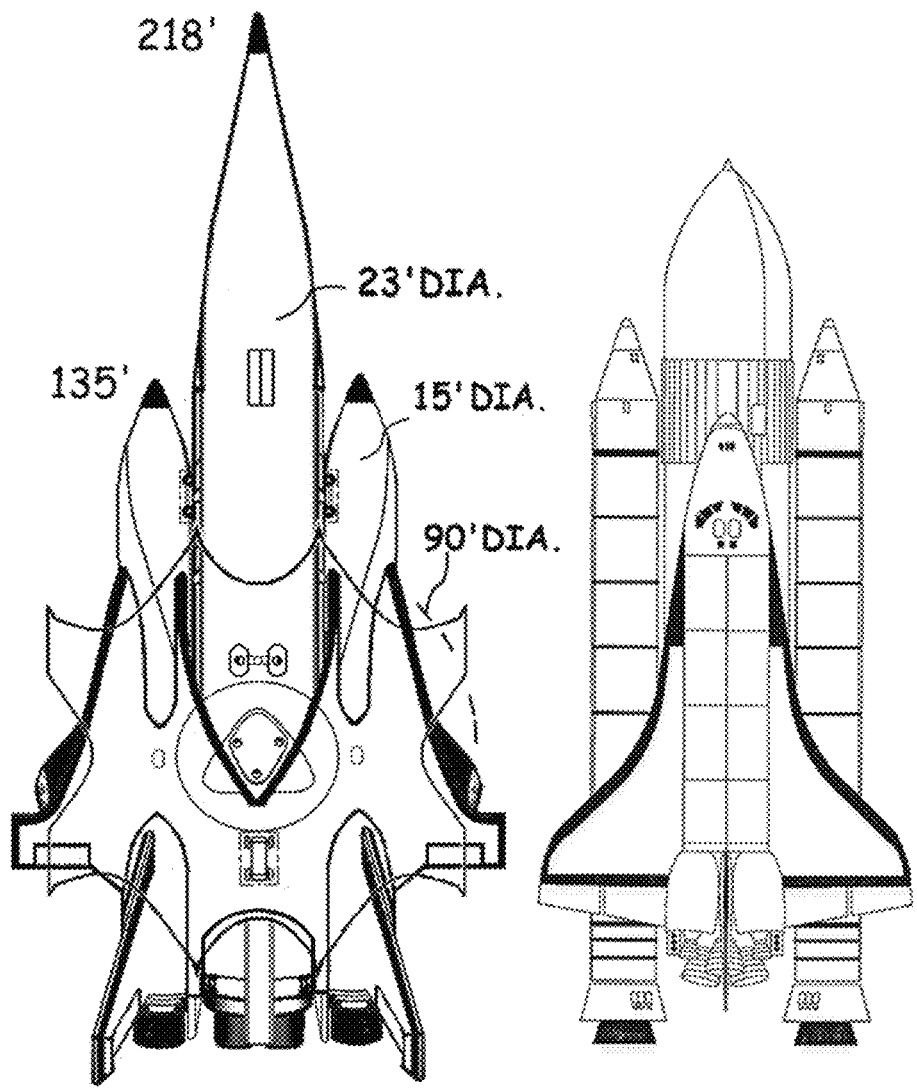
FIG. 10a is a scale view of the preferred booster launch system.
FIG. 10b is a scale view of the retired space shuttle illustrating relative height, size and lift capacity when compared to other larger and taller proposed heavy lift systems.
Figure 41:
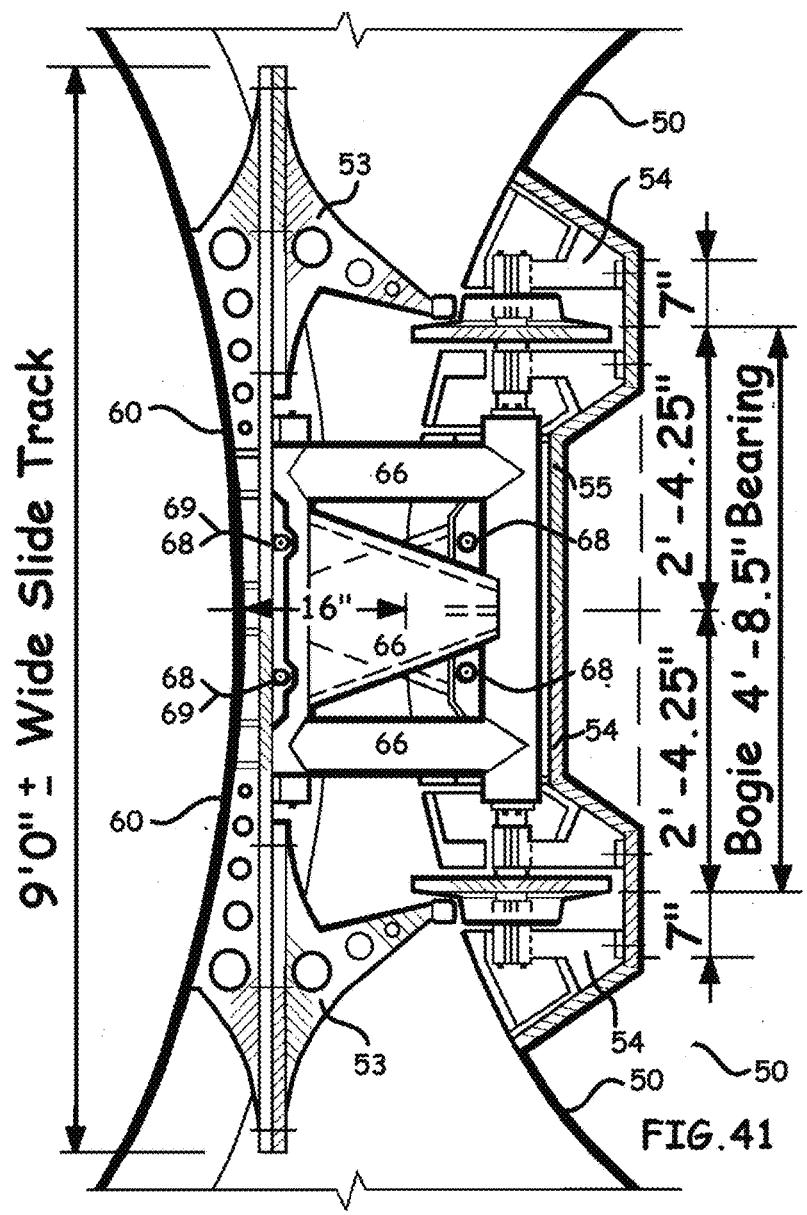
FIG. 41 is a plan view of the slip track assembly between the central stage two booster and one of the two twin stage one boosters.

Referring now to the invention shown in FIG. 41. In this top view the slip track system between one of two stage one boosters, 50 on the right and a center stage two booster, 60 is shown on the left. This slip track system, 53 is designed but not limited to attachments between a standard rocket, 60 or reusable stage two drone booster, 60 and the twin drone stage one boosters, 50 assembly system 54, 55, 56 and 57. The slip track system, 53 allows the separation of stages while stage two, 60 is still carrying two shuttles in the upper atmosphere per launch. A launch cost savings is achieved. Removable 12 foot segments, along one rail track, 53 allow the boogie wheel assemble, 54 to slip pass one rail at pre-launch set up. Standard retractable hinged tube truss anchor release, 66 are used at each bogie assembly, 54 to support prelaunch and launch loads. Anchor pyro bolts, 68 with actuators coordinate the stage separation at 5 boogie assembly, 54 and 55 support locations as shown in FIG. 10.

Figure 42:
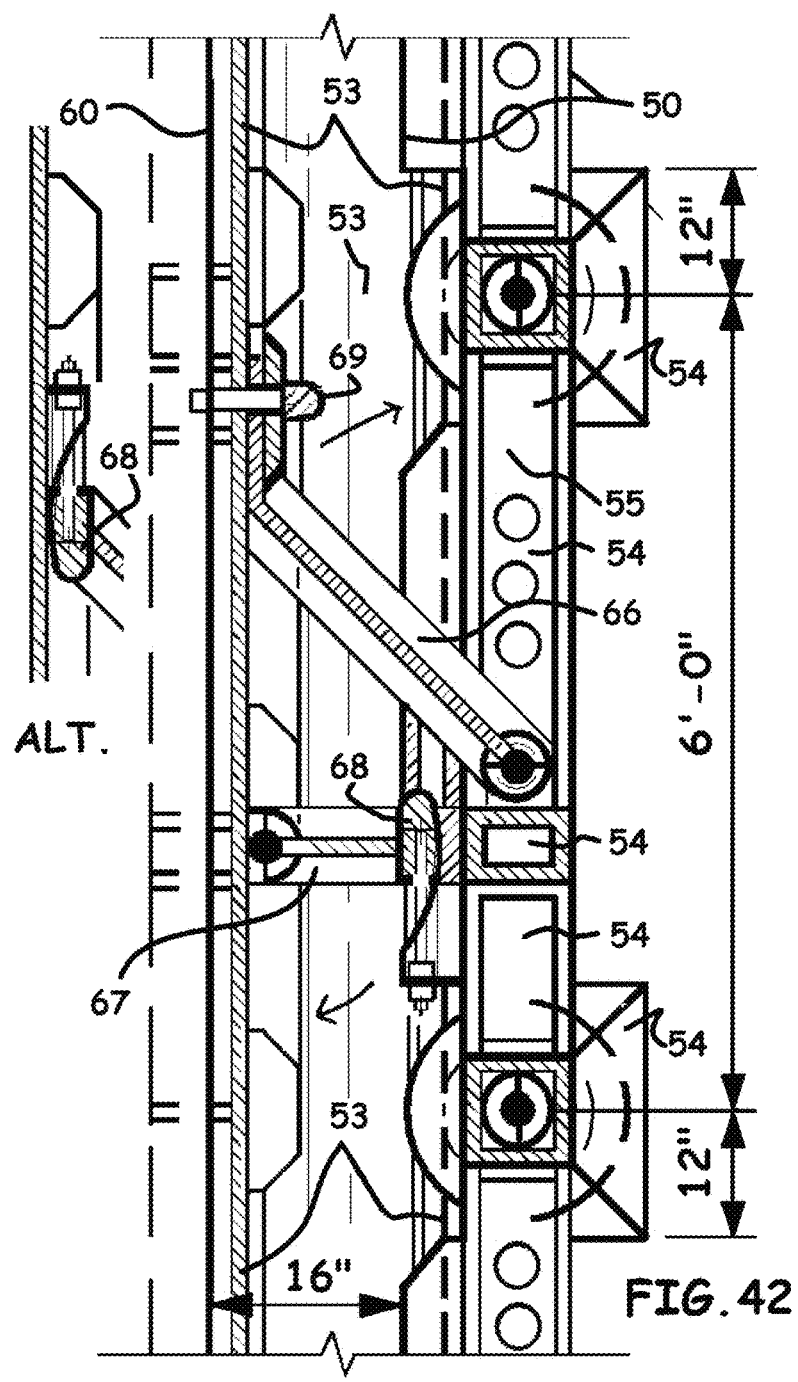
FIG. 42 is a section view of the slip track assembly between the central stage two booster and one of the two twin stage one boosters showing brace attachment and internal stage one bogie assembly shown in FIG. 10.

Referring now to the invention shown in FIG. 42. In this cross section, the slip track, 53 rail systems between one of two stage one boosters, 50 on the right and a center stage two booster, 60 is shown on the left. The four wheel bogie assembly, 54 of aluminum and composite wheels is uniquely recessed aerodynamically inside the reusable twin booster fuselage, 50 with minimum loss of fuel storage area or aerodynamic drag. The 20 inch but not limited to this dimension, bogie wheel diameters and profile insure alignments with four wheels per bogie, 54 and stresses proven in the transport rail industry. This cross section illustrates the failsafe slip track, 53 rail systems with or without actuators or pyro bolt, 68 and 69 connectors.

Figure 43:
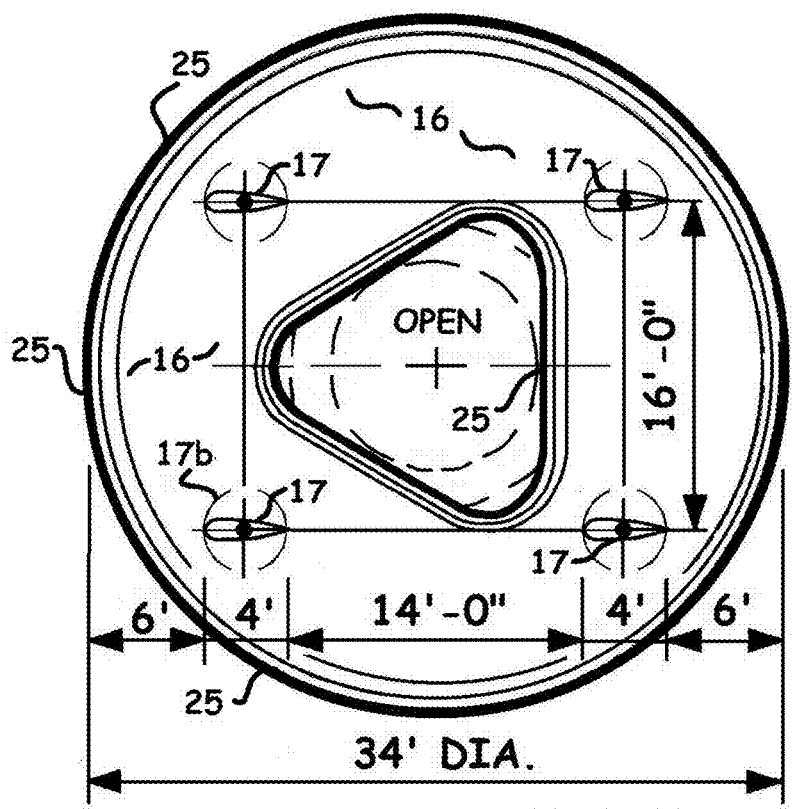
FIG. 43 is a top view of the retractable underbody ring wing illustrating an open but not limited to a triangular center.

Referring now to the invention shown in FIG. 43. In this top view, the retractable underbody ring wing, 16 illustrates an open but not limited to a triangular center. Current state of the art aircraft still maintain wide wing spans. At the center of a uniquely circular aerodynamic body plan 10, the alternate circular ring wing, 16 is preferred below the main aerodynamic body, 10 in biplane fashion. The lightweight composite wing, 16 profile ring wing. 16 leading edges, 25 maintain a circular yet swept wing air angle of attack. The inner open triangle and resulting straight leading edge, 25 along the rear air foil enables greater vortex lift.

Figure 44:
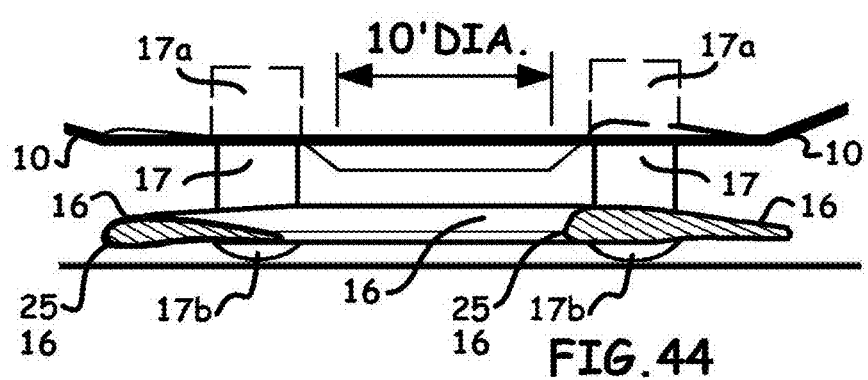
FIG. 44 is a side section view of the retractable underbody ring wing illustrating an open center, vertical strut stabilizer locations and optimized wing surface air flow angle of attack wing profile areas.

Referring now to the invention shown in FIG. 44. In this cross section view the retractable capability and aerodynamic properties of the ring wing 16 are illustrated. The ring wing, 16 has 4 partially spherically rounded surfaces, ring wing bearing spheres, 17b that actually touch the ground below each vertical stabilizer strut, 17 protecting the ring wing, 16 under surface. The ring wing, 16 can be retracted or raised flush with the shuttle heat tile underbody, 10. Four upper cargo bay hydraulic cabinets, 17a receive the retracted wing vertical stabilizer struts, 17 during supersonic or reentry flight. The under body of the main lift body, 10 is tapered to receive the ring wing, 16.

The advantages of the present invention include, without limitation the following: The centripetal aerodynamic platform spacecraft of the present invention is shorter than the retired space shuttle with better mass to shape properties, lighter in weight than the shuttle with internal jet to rocket launch assist and therefore it is a more efficient launch system with each shuttle carrying its own weight at initial launch. Further, the craft is capable of producing 1G in orbit without a space station. The invention has atmosphere reentry capable and is reusable. The present invention is better than present high stacked can container, non-reusable, heavy lift systems.

The advantages of the present invention include, without limitation, a 90 foot wing tip to wing tip diameter aerodynamic platform: The interior 1G ring corridor has an optimized, without limitation, radius of approximately 33 feet, resulting in a vehicle radius small enough to launch yet adequate to achieve 1G habitats in space. When the aerodynamic platform spins in deep space or at the poles of a spinning asteroid at 9.5 rotations per minute the ring corridor achieves a 1G rotating gravity environment that will prove advantageous during deep space missions. The design reduces the effects of zero G gravity that would otherwise impact the crew's muscle health, immune system, bone density, work and sleep cycles. The flattened aerodynamic sphere achieves an architecturally appropriate, habitable environment when it has reached its destination.

In broad embodiment, the invention is an aerodynamic platform capable of independent vertical liftoff, achieving low earth orbit, producing 1G interior environments and adaptable for deep space missions.

The centripetal aerodynamic platform spacecraft design and heavy lift system incorporates several advantageous and unique embodiments as defined herein. The patent outlines how a deep space vehicle should be configured as a comprehensive reusable working machine. The Centripetal Aerodynamic Platform Spacecraft (CAPS) replacement shuttle and ground based heavy launch system advantages:

Design Advantage 1: First and foremost what is unique about this design? The platform is actually a lifting body. A lifting body uses the entire surface area of the flying machine to provide lift. What is patentable and advantageous about this particular design is its aerodynamic shape and circular configuration as compared to many flying wings or standard aircraft thus minimizing surface area material cost and drag. The embodiment advances mankind's knowledge.

Design Advantage 2: A second element that is very patentable and has advantages over linear wing aircraft is the lower ring shaped wing provides stability to the aircraft and also because this is potentially a replacement for the space shuttle, it provides some tumble resistance stability as the craft reenters the atmosphere. Long wing spans are eliminated with the wing surface much like a biplane in this embodiment below the lifting body. This retractable ring on the bottom also serves as landing struts and small removable device platform in addition to the standard three landing wheels typically found on an aircraft. The invention has the advantage or unique ability to land with standard wheels and then lowers the body to ground level hydraulically by lowering the ring wing to ground, raising wheels and then raising the ring wing.

Design Advantage 3: The third patent design element in this embodiment as shown are two horizontal inline hollow core turbojet-scramjet-rocket engines with adjustable horizontal to vertical rear exhaust. And two vertical inline hybrid turbojet-rocket engines that provide the lift in the front. Engine design placement allows vertical lift off or 60 degree plus takeoff capability eliminating or reducing runway length. The engines are powered in deep space by a mixture of liquid methane and liquid oxygen fabricated by on board fuel recovery systems. The internal system during landings takes carbon dioxide and combines it with hydrogen to produce methane oxygen liquid fuel mixture pressured fuel injection. 100 percent of the oxidizer with a low-fuel ratio will power the oxygen turbine pump, and 100 percent of the fuel with a low-oxygen ratio will power the methane turbine pump. Oxidizer and fuel streams will be completely in the gas phase before entering the combustion chamber. Such embodiments require lower pressures through the pumping system, increasing life span and further reducing risk of catastrophic failure and the ability to increase the combustion chamber pressure and thrust performance. Methane is found on many deep space destinations along with oxygen that will be extracted from water in ice or extracting it from carbon monoxide also found on many deep space destinations. Potentially the biggest advantage of using methane is that this material occurs abundantly and could be manufactured on many worlds that future spacecraft will visit. On Mars, for example, methane could be made by the Sabatier process, mixing carbon dioxide with hydrogen then heating the mixture to produce methane and water. The Martian atmosphere is an abundant source of carbon dioxide, and the relatively small amount of hydrogen required for the process could be brought along from Earth (5% of standard return fuel tank requirements) or gathered on site from Martian ice. On Saturn's moon Titan, methane literally falls from the sky. Titan is dotted with lakes and rivers of methane and other hydrocarbons that could one day serve as fuel depots. The atmospheres of Jupiter, Saturn, Uranus and Neptune all contain methane, and Pluto has frozen methane ice on its surface. Some rocket fuels (hypergolic propellants), ignite spontaneously when mixed with the oxidizer, but methane requires an ignition source. Ignition sources hard to make in the outer solar system are stored onboard and engines are internal within heated zones when compared to remote exterior wing mounted engines where planetary temperatures drop to hundreds of degrees below zero. This interior engine embodiment assures the engines will ignite reliably in all conditions. The igniter, methane and oxidizer tanks could also be smaller, because liquid methane is denser, yet lighter than a liquid hydrogen fuel, again saving money and weight. This embodiment eliminates launches from Earth requiring excessive return fuel payloads.

Design Advantage 4: The location of the circular 1G corridor. In this embodiment, when the entire ship rotates at 9.5 revolutions per minute can provide 1G gravity. This is important because all previous designs of the space shuttle and present spacecraft proposals do not recognize the impact on the human body in terms of long term exposure to zero to 0.15G environments. This craft configuration solves that problem and also creates a flexible customary habitat when landed that can be used as long or short term base of operations. And because of its vertical lift capabilities can also be used in areas where landing strips are not available. Base of operations can be relocated fast and efficiently.

Design Advantage 5: In this embodiment, the pilot's area in the front when not reclined back 90 degrees, face the pilots out toward the front and when the craft is in deep space and the craft is rotating the seats and or floor under the seats will recline back 90 degrees and become a part of the 1G corridor system created by the interior ring corridor. As you walk along interior ring rotating gravity corridor it would give you the impression that you are walking along a corridor. The starboard and port side habitable 1G area work on land or in deep space. Astronauts would actually be walking on a slightly curved upward rising corridor to create the 1G work, sleep zones.

Design Advantage 6: This somewhat circular aircraft or similar reentry vehicles embodiment are equal in payload volume yet shorter and of less height with no vertical tail when compared to the retired space shuttle when mounted for launch, requiring shorter booster rockets, launch towers and lowering service heights on the launch pad.

Design Advantage 7: In this embodiment the shuttle or aerodynamic platform spacecraft and payload bay is lower to the ground for loading than other proposed heavy launch systems reducing service cost. Two parallel horizontal engines flank the rear shuttle bay that is capable of carrying payload capacities equal to other proposed heavy lift system weights required by congress. The proposed shuttle bay is 60 feet long, 16 feet wide and 14 feet high with lower front optional bay doors and upper and lower rear bay doors as shown in the plans.

Design Advantage 8: The launch system has lower cost. This launch system sets new industry standards. When the shuttle is placed on the triple booster rockets because they only weigh 125,000 pounds each yet offer more payload-volume dollars per liftoff, launch cost are reduced. Also two shuttles can be attached to a single stage two booster, saddled by double stage one boosters. Launched in parallel fashion two of these shuttles per liftoff are possible. This decreases the cost of the standard deep space liftoff preparation from 500 million to 250 million or less considering all components are reusable after the first mission. All of the components of this system including the triple booster rockets are reusable, as compared to any present proposal for deep space exploration. Reusable shuttles and boosters substantially reduce launch cost over time. To reduce fuel weight at takeoff on short take off space ports or at sea on launch vessels, magnetic-steam-methane catapults, saving onboard fuel for return or deep space missions are optional but not necessary. The launch system also creates new economies of scale for launch ports and new service industries.

Design Advantage 9: These shuttles also have the ability to enter space on their own power with new industry inline hollow core hybrid turbojet-scramjet-rocket engines as shown. The independent shuttle accent uses gravity velocity assist, compression lift and atmospheric skip to achieve low Earth orbit. The embodiment uses but is not limited to a sine curve seven step accent with a trajectory of but not limited to 45% to the earth's surface. Initial launch speed would reach Step 1 Mach 1.5 adding Mach 3 on the downward curve with gravity assist then adding another Mach 1.5 of internal energy on the upslope accent to reach Step 2-Mach 4.5. The sine curve accent would continue reaching Step 3-Mach 8.5, Step 4-Mach 13, Step 5-Mach 17.5, Step 6-Mach 22 and Step 7-Mach 26.5. Escape from a lunar surface would require 1/20 the power. During reentry, three sided front variable volume air intakes and rear engine exhausts are covered by flat single hinge triangular stealth angled doors when engines are not in use to protect the engines. The front engine protection doors are an advantage during reentry protecting highly complex engine intake parts from fire ball reentry conditions when compared to wing mounted or exterior mounted nacelle engines that have greater probability of being ripped off during uncontrolled reentry conditions when compared to the internal engine aerodynamic body embodiment.

Design Advantage 10 In this aerodynamic platform spacecraft embodiment turbojet launch assist is possible. During heavy lift off deep space launches, shuttles are compatible with triple boosters as a part of the launch system. The system has jet assist from the actual shuttle requiring less liquid oxygen and tank weight. With turbojet launch assist, the shuttles carry most of their own weight at liftoff. Shuttles later transitions from turbojet to afterburner, then scramjet in the upper atmosphere and finally to rocket propulsion.

Design Advantage 11: The flexibility of the system elements can also serve the military. The craft can serve as mission staging areas and used by private sector support, transporting cargo into space. The shuttles also eliminate cost or need for shelter at the destination. The platform offers instant base establishment and also remote drone critical mission base establishment, bringing cargo before personnel, establishing a front line point that could be easily removed in space or during Earth service missions. This is a highly efficient mass to volume stealth body and each line on its surface, when the lower wing is raised creates a very appropriate stealth body with multiple curvatures.

Design Advantage 12: This embodiment is ideal for deep space missions. In addition to its centripetal 1G capability, the shuttles can be attached or physically stacked in formation while in deep space route with each still providing 1G environment and most importantly, providing a sustainable safe independent environment or staging space station platform. All system components can be standardized with flexible interior volume to exterior surface area maximized. Two Pre-Mars Mission Saddled CAPS Tanker Drones, launched on the two stage drone booster system have the capacity to refuel in Earth orbit deep space mission craft. Two shuttle platforms can then be launched simultaneously for deep space mission destinations, followed by a third pair launched immediately resulting in four shuttles to Mars or beyond. The first two mission critical drone supply and habitat vehicles would be followed by two Earth return vehicles all with independent capability and backup compatible parts. Two shuttle platforms could remain at the designation providing established habitats and backup launch capability for future arrivals. This embodiment and launch system approach is more sustainable, cost less and safer than present proposals for deep space explorations because the standardized aerodynamic platform tested template having flexible interior twin configurations, can be mass produced by assembly line manufacturing.

The preferred embodiment platform offers, but not limited to 1G capability, scramjet and or future magnetic channeled plasma chemical engine capability and reuse capability. Per refined government guidelines, the embodiment, in flight and in space exploration design standards can serve the private sector. Because of its repetitive system components and mass assembly line potential, a ten year period of development and implementation is possible. Also by using said standardized, yet flexible centripetal aerodynamic platform spacecraft, the sheer quantity of repetitive production will ultimately win any space race. The design embodiment, within existing and emerging industry standards, solves high fuel and energy consumption during launch in an advantageous, efficient and cost effective manner. The reusable logistics model, craft embodiment and launch system patent, a holistic synthesis, is what the aerospace industry and public always desired from a political and mass market perspective.

Full embodiment rotation with fixed centripetal rotating gravity corridors reduces the number of moving parts, weight, maintenance, structural bearing and centripetal force energy loads, thus simplifying this machine patent. For this reason the better good envelope embodiment with secondary spaces or fewer or no levels adaptable to independent rotation combined within a primary full structure rotating gravity producing envelope illustrated in a composite of FIGS. 10, 11, 35, 36, 37, 40, 41, 42, 43 and 44 is the preferred embodiment.

Will the aerodynamic machine work as a system to create interior artificial gravitational forces in space? The laws of centripetal force, rotating gravity and surface area aerodynamic lift are reliable, industry proven and first combined herein as the preferred embodiment. Yes, this utility patent embodiment for the Aerodynamic Platform Spacecraft will work.

The preferred embodiment of the new aerospace shuttle is described herein as the Centripetal Aerodynamic Platform Spacecraft and supporting Launch System. Different global configurations of the embodiment are possible and generally consist of a balanced center of gravity massing and or envelope capable of producing internal rotating gravity, habitable in space and or with reentry capabilities, without going outside the scope of the invention.

This patent describes the aerodynamic reusable replacement for retired space shuttle embodiments, current fuel inefficient, heavy lift systems or fuel inefficient reusable reentry systems and offers new aerodynamic mini space stations capabilities defined here in as a Centripetal Aerodynamic Platform Spacecraft, (CAPS) having reentry capability as well as more advantageous launch, logistics and support systems.

While, the foregoing written description and related specificity has been discussed on all components in as much detail as practical herein, the intent of this patent is to illustrate unique component relationships, configurations and the assembly of the embodiment, utilizing existing aerospace standards, laws of nature, present aerospace manufacturing capabilities and industry standard maintenance logistics.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A centripetal aerodynamic platform spacecraft, thruster engine propelled, space access system, having accent, orbital and reentry configurations; said system comprising:
   a) a spacecraft body;
   b) an exterior region of said spacecraft body;
   c) an interior region of said spacecraft body;
   d) a plurality of thrust propulsion engines comprising air intake and thrust exhaust conduit within said interior region of said spacecraft body;
   e) the exterior region streamlined on said spacecraft body, and configured to allow high speed flight and aerodynamic atmospheric reentry capability;
   f) a plurality of loading ramp doors and cargo bay doors disposed on said spacecraft exterior region;
   g) the spacecraft body, comprising a balanced rotational center of mass and aerodynamic lifting and control surfaces;
   h) the spacecraft body, comprising a flattened sphere or disk-shaped, lifting body;
   i) the exterior region of said spacecraft body comprising an aerodynamic shape configured to enable airplane operational utility and a spacecraft hull maintaining habitable interiors; said exterior region comprising an aerodynamic flattened sphere profile;
   j) the interior region of said spacecraft body having a lifting body interior circumference boundary(s) that shapes the spacecraft hull of said spacecraft;
   k) the interior region of said spacecraft body is configured to simulate a desired percentage(s) of earth's 1G gravity when said lifting body interior circumference boundary(s) is attached within the interior region and is in full spacecraft body rotation, spinning about a vertical -Z- axis at a point in space, in obit or when transporting humans in space;
   l) the interior region of said spacecraft body comprising aerospace navigation utility systems, engine instrumentation, energy storage, life support systems, electrical storage and generation and fuel storage around a central cargo bay flanked by the plurality of thrust propulsion engines;
   m) the plurality of said thrust propulsion engines comprising one or more forward-front interior cased, vertical lift, downward directed thrust engines and a plurality of interior cased rear-aft directed thrust engines having horizontal to vertical nozzle pivot thrust capability;
   n) a plurality of fuel and oxidizer storage disposed within the spacecraft body;
   o) an aerodynamic circular shaped ring wing with integral vertical stabilizers on an underside of said exterior region of said spacecraft body;

p) a plurality of engine air intake protection door(s) and recessed aerodynamic combustion air inlet(s) disposed on said spacecraft body;
q) a plurality of retractable landing gear, disposed on a lower exterior region of the spacecraft body;
r) plurality of maneuvering thrusters disposed on the said exterior region;
s) a prelaunch compatible curved saddling common wing connecting two boosters comprising a releasable connection assembly;
t) a heavy lift vertical booster prelaunch connecting means comprising a prelaunch booster connection assembly and in flight stage separation guide rail assembly for heavy lift booster launching; and
u) a track with an alignment system configured to eliminate full body rotation of said spacecraft body.

2. The system as described in claim 1, further comprising:
a) a front pilots cabin with 90 degree rotating seats positioned within the interior region of said spacecraft body;
b) a passenger sleep quarters;
c) a spacecraft airlock associated with the interior region of said spacecraft body; and
d) a storage area(s) within the interior region of said spacecraft body.

3. The system as described in claim 1, wherein the aerodynamic circular ring wing further comprises:
a) an aerodynamic open center, and a washer-shaped ring wing surface;
b) the plurality integral vertical stabilizers are retractable and are configured to serve as a retractable vertical landing strut assembly;
c) an exterior underbody region recessed circular, aerodynamic concave receiving profile for said washer-shaped ring wing; and
d) a mechanical interior housing for said plurality of vertical stabilizers when the aerodynamic circular ring wing is raised or retracted.

4. The system as described in claim 1, further comprising a plurality of single hinged recessed aerodynamic engine protection door(s) configured to rest in a concave three sided, triangular curved and tapered recess(s); said plurality of single hinged recessed aerodynamic engine protection door(s), hinged only on one side of said tapered recess(s) in the spacecraft body, the aerodynamic engine protection door(s), having a single side, single hinged, door pivot axis, recessed at one end forming a tapered aerodynamic indention on the exterior region forming an aerodynamic concave SCOOP; said system having the plurality of single hinged recessed aerodynamic engine protection door(s) further comprising:

a) an actuator assembly;
b) one or more door seal elements;
c) an alignment and configuration of exterior body surfaces;
d) a recessed triangular door frame(s);
e) one or more exposed side(s) having protection surface layer(s);
f) an internal structural door panel ribs strengthening element(s); and
g) a recessed triangular exterior surface on the exterior region configured to receive one of said plurality of aerodynamic engine protection door(s) when opened, thereby enabling the one of said plurality of aerodynamic engine protection door(s) to securely rest against the aerodynamic body envelope within recessed variable side length triangular exterior surfaces conforming to contoured aerodynamic surfaces around engine bay protection door openings; said plurality of aerodynamic engine protection door(s) providing engine protection during reentry, and when in hazardous environments, eliminating double hinged, exterior door openings, double flaps, and non-aerodynamic components on exterior surfaces.

5. The system as described in claim 1, wherein the plurality of thrust propulsion engines further comprises a plurality of hybrid horizontal rear directed thrust and vertical downward directed thrust engineer said engineer comprising phased supersonic to hypersonic turbojet engines components wherein a first propellant fuel is atmospheric oxygen and jet fuel; said engines transition to rocket thrust engine components wherein a second propellant is liquid oxygen and rocket fuel.

6. The system as described in claim 1, further comprising a rotation track support alignment system supporting at least one or more freely independently rotating centripetal rotational gravity corridor(s), within said interior region of said spacecraft body rotating at variable speeds; said rotation track support alignment system comprising:
a) a fixed alignment track(s);
b) a roller pin alignment bracket assembly with axle slip spin dry lubricant surfaces attached to said fixed alignment track(s);
c) an unfixed bearing track(s);
d) a composite polymer ball bearing assembly between the said fixed and unfixed tracks; and
e) a free self-lubricating, solid polymer, lubricant ball bearing separator-spacer assembly within facilitating even ball bearing migration and rotation of said centripetal rotational gravity corridor(s).

\* \* \* \* \*